(12) United States Patent
Megaw

(10) Patent No.: US 10,135,340 B1
(45) Date of Patent: Nov. 20, 2018

(54) PASS THROUGH REGULATION OF BUCK-BOOST REGULATOR

(71) Applicant: Linear Technology Holding LLC, Norwood, MA (US)

(72) Inventor: David James Megaw, Gilbert, AZ (US)

(73) Assignee: Linear Technology Holding LLC, Norwood, MA (US)

( * ) Notice: Subject to any disclaimer, the term of this patent is extended or adjusted under 35 U.S.C. 154(b) by 0 days.

(21) Appl. No.: 15/701,380

(22) Filed: Sep. 11, 2017

(51) Int. Cl.
*H02M 3/158* (2006.01)

(52) U.S. Cl.
CPC .................... *H02M 3/1582* (2013.01)

(58) Field of Classification Search
CPC .... H02M 3/156–3/158; H02M 3/1582; H02M 3/1584; H02M 2001/007; H02M 2001/0045; G05F 1/24; G05F 1/32; G05F 1/34; G05F 1/147; G05F 1/247; G05F 1/563
USPC .......................................... 323/259–261, 266
See application file for complete search history.

(56) References Cited

U.S. PATENT DOCUMENTS

| | | | | |
|---|---|---|---|---|
| 5,479,090 A | * | 12/1995 | Schultz | G05F 1/56 323/284 |
| 7,164,259 B1 | * | 1/2007 | Megaw | G05F 3/30 323/313 |
| 9,660,533 B2 | * | 5/2017 | Choudhary | H02M 1/14 |
| 2003/0033550 A1 | * | 2/2003 | Kuiawa | G06F 3/04817 713/340 |
| 2009/0262556 A1 | * | 10/2009 | Tomiyoshi | H02M 3/1582 363/17 |
| 2014/0225577 A1 | * | 8/2014 | Ivanov | H02M 3/1582 323/225 |
| 2017/0005577 A1 | * | 1/2017 | Chen | H02M 3/1582 |
| 2017/0155324 A1 | * | 6/2017 | Choquet | H02M 3/1582 |
| 2017/0201178 A1 | * | 7/2017 | Cheng | H02M 3/1582 |
| 2017/0373600 A1 | * | 12/2017 | Wang | H02M 1/08 |

* cited by examiner

*Primary Examiner* — Yemane Mehari
(74) *Attorney, Agent, or Firm* — Schwegman Lundberg & Woessner, P.A.

(57) ABSTRACT

A controller may control a buck-boost regulator having an input voltage and an output voltage. The controller may include: circuitry that causes the output voltage of the buck-boost regulator to be at the bottom of a pre-determined voltage window when the input voltage goes below the bottom of the pre-determined voltage window: circuitry that causes the output voltage of the buck-boost regulator to be at the top of the pre-determined voltage window when the input voltage goes above the top of the pre-determined voltage window; and circuitry that causes the buck-boost regulator to pass the input voltage through the buck-boost regulator so as to cause the voltage output of the buck-boost regulator to be at the same level as the input voltage when the input voltage is within the pre-determined voltage window.

27 Claims, 11 Drawing Sheets

PASS THROUGH REGULATION OF BUCK-BOOST REGULATOR

FIELD OF THE DISCLOSURE

This disclosure relates to controllers for buck-boost regulators.

BACKGROUND

There are several approaches for controlling buck-boost regulators. These include: (1) a conventional approach with a fixed output voltage; (2) cascading independent buck and boost regulators that both allow 100% duty cycle top switch operation and program their output voltages to create a pass-through region; and (3) placing a parallel current path (hot swap, ideal diode controller, load switch, or relay etc.) around the buck-boost regulator and using a window comparator to toggle between the buck-boost regulator and the parallel current path. Each approach, however, can have disadvantages, as now described.

A conventional fixed output voltage buck-boost regulator, for example, can include specifications that apply to automotive and industrial electronics and that often have a range of acceptable input voltages (e.g. LV224:9V-16V, LV248: 36V-52V). These may lend themselves to window regulation, whereas conventional buck-boosts regulate a fixed output voltage. Buck-boost regulators may be needed to maintain output voltage regulation during fault conditions (e.g. surges, load dump, cold start), while the input and output voltages are close in value the vast majority of the time. Continuous switching of a buck-boost regulator can also degrade efficiency and generates EMI. This may be doubly true in the buck-boost region (VIN–VOUT) where all 4 power MOSFETs are switching. Methods to improve efficiency may offer improvement at light loads (discontinuous conduction mode, burst switching). Methods to improve EMI during switching (e.g., PCB layout, spread-spectrum switching frequency) may only partially solve the problem. The maximum current/power dissipation of a buck-boost regulator may also be limited by the maximum boost duty cycle when the input current and associated conduction losses reach a maximum.

Cascaded 100% duty cycle buck and boost regulators that create pass window may also suffer from problems. The inductor current may be uncontrolled in the pass-through window for the boost and buck regulators. Damage can result from excessive current in the inductor and power MOSFETs. Cascaded high-Q RLC tanks exist between input and output in the pass-through region and large amplitude ringing of inductor current and output voltage can result from line and load transients. This limitation may cause the pass-through window to be small in most applications. Startup may be poorly controlled when input is within pass-through region. Two inductors and two output capacitors may be required, degrading efficiency, and increasing solution size and cost. Four-switch buck-boost switching at pass window boundaries may not be possible.

Parallel path around buck-boost enabled with a window comparator may also suffer from problems. A parallel path switch device, if fully enhanced or linearly controlled, may be subject to SOA constraints and easily damaged. It may require a timer for protection, meaning an interruption in the output voltage may be possible. Quiescent current in the parallel path device may be high, if the ability to quickly enable and disable that path is retained. Transitioning between parallel path conduction and buck or boost regulation may cause large output sag due to startup delay/soft-start ramp as the inductor current may have to start from zero. The inductor may be helpful filtering input noise and taming extreme transients (e.g. circuit breaker events). It may be better to keep it in the current path. Boost capacitors used for the buck and boost top gate drivers may provide an ideal charge reservoirs to quickly turn on/off power MOSFETs. But the alternate path circuit may use a low value charging current from an internal charge pump and turn on may be slow.

SUMMARY OF THE DISCLOSURE

A controller may control a buck-boost regulator having an input voltage and an output voltage. The controller may include: circuitry that causes the output voltage of the buck-boost regulator to be at the bottom of a pre-determined voltage window when the input voltage goes below the bottom of the pre-determined voltage window; circuitry that causes the output voltage of the buck-boost regulator to be at the top of the pre-determined voltage window when the input voltage goes above the top of the pre-determined voltage window; and circuitry that causes the buck-boost regulator to pass the input voltage through the buck-boost regulator so as to cause the voltage output of the buck-boost regulator to be at the same level as the input voltage when the input voltage is within the pre-determined voltage window.

The buck-boost regulator may include an inductor with an input and an output, a top power switch that controllably connects the input of the inductor to the input voltage, a top power switch that controllably connects the output of the inductor to the output voltage, a bottom power switch that controllably connects the input to the inductor to ground, and a bottom power switch that controllably connects the output of the inductor to ground. The controller may further include circuitry that causes the two top power switches to be continually on and the two bottom power switches to be continually off when the input voltage is within the pre-determined voltage window.

The pre-determined voltage window may be a first voltage window. The controller may further include: circuitry that causes the buck-boost regulator to operate in a buck mode when the input voltage is above a second voltage window that is just above or partially overlapping the top of the first voltage window; circuitry that causes the buck-boost regulator to operate in a buck-boost mode when the input voltage is within the second voltage window; circuitry that causes the buck-boost regulator to operate in a buck-boost mode when the input voltage is within a third voltage window that is just below or partially overlapping the bottom of the first voltage window; and circuitry that causes the buck-boost regulator to operate in a boost mode when the input voltage is below the third voltage window.

The buck-boost regulator may include an inductor with an input and an output, a top power switch that controllably connects the input of the inductor to the input voltage, a top power switch that controllably connects the output of the inductor to the output voltage, a bottom power switch that controllably connects the input to the inductor to ground, and a bottom power switch that controllably connects the output of the inductor to ground. The controller may further include, when the input voltage is within the first predetermined voltage window: circuitry that causes the buck-boost regulator to operate with the top power switches continually on and the bottom power switches continually off when the magnitude of the inductor voltage does not exceed a predetermined threshold; and circuitry that causes the buck-boost regulator to operate with the input and/or output power switches actively switching to reduce the inductor voltage when the magnitude of the inductor voltage exceeds the pre-determined threshold.

The buck-boost regulator may include an inductor that conducts current and has an input and an output, a top power switch that controllably connects the input of the inductor to the input voltage, a top power switch that controllably connects the output of the inductor to the output voltage, a bottom power switch that controllably connects the input to the inductor to ground, and a bottom power switch that controllably connects the output of the inductor to ground. The controller may further include, when the input voltage is within the first predetermined voltage window: circuitry that causes the buck-boost regulator to operate with the top power switches continually on and the bottom power switches continually off when the magnitude of the current in the inductor does not exceed a pre-determined threshold; and circuitry that causes the buck-boost regulator to operate with the input and/or output power switches actively switching to regulate or limit the inductor current when the magnitude of the current in the inductor exceeds the pre-determined threshold.

The buck-boost regulator may include an inductor that conducts current and has an input and an output, a top power switch that controllably connects the input of the inductor to the input voltage, a top power switch that controllably connects the output of the inductor to the output voltage, a bottom power switch that controllably connects the input to the inductor to ground, and a bottom power switch that controllably connects the output of the inductor to ground. The controller may further include: an error amplifier with an output that controls the current through the inductor: circuitry that causes the buck-boost regulator to operate with the top power switches continually on and the bottom power switches continually off during a non-switching mode; circuitry that causes the buck-boost regulator to operate with the input and/or output power switches actively switching to regulate the output voltage, inductor voltage, or inductor current during a switching mode; and circuitry that adjusts the output of the error amplifier to a level that causes the value of the inductor current immediately after the transition to be the same as the average value of the inductor current immediately before the transition when transitioning from the non-switching mode to the switching mode.

The controller may further include circuitry that allows the top and bottom of the pre-determined voltage window to be set to the same level.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
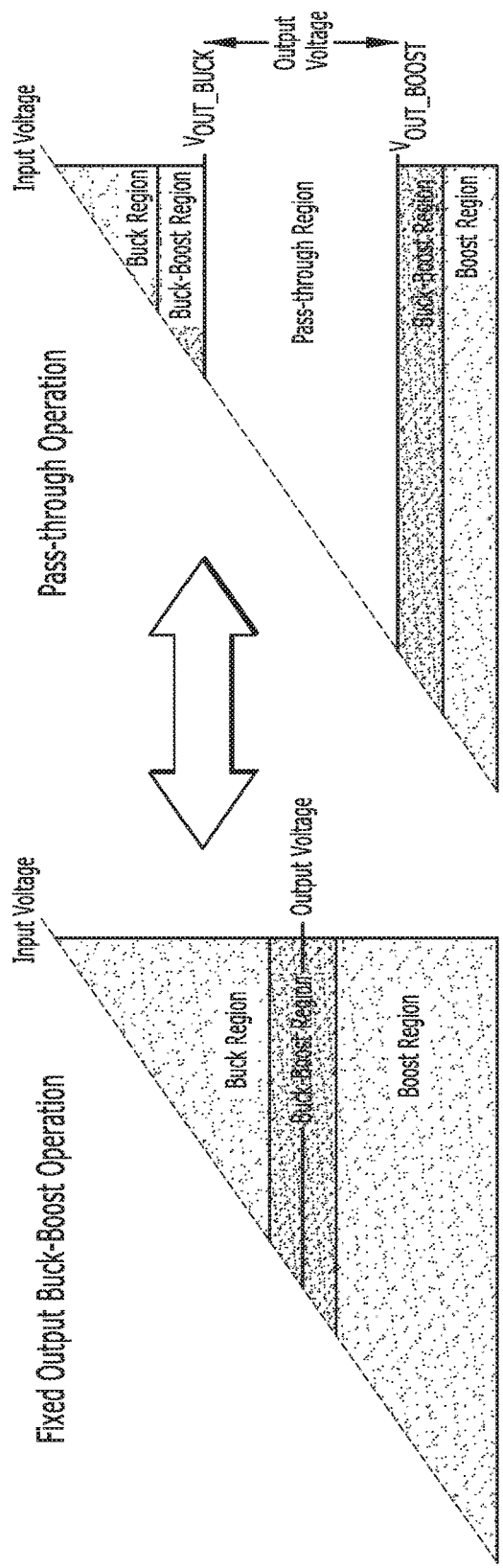
FIG. 1 compares an example of conventional buck-boost operation on the left with an example of pass-through regulation on the right.
Figure 2A:
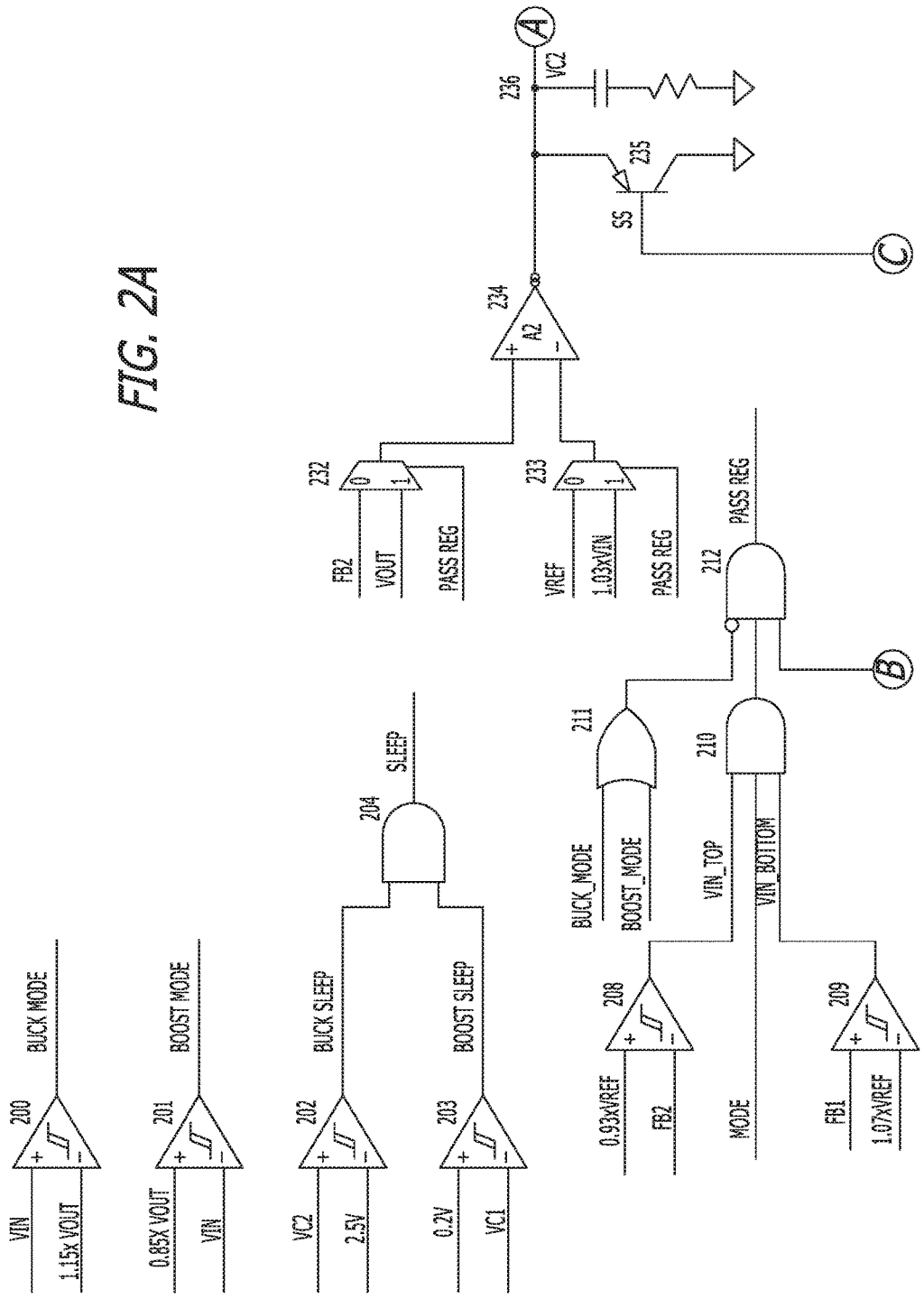
FIGS. 2A-D illustrate an example of a buck-boost regulator and a controller that implements pass through regulation of the buck-boost regulator.
Figure 2B:
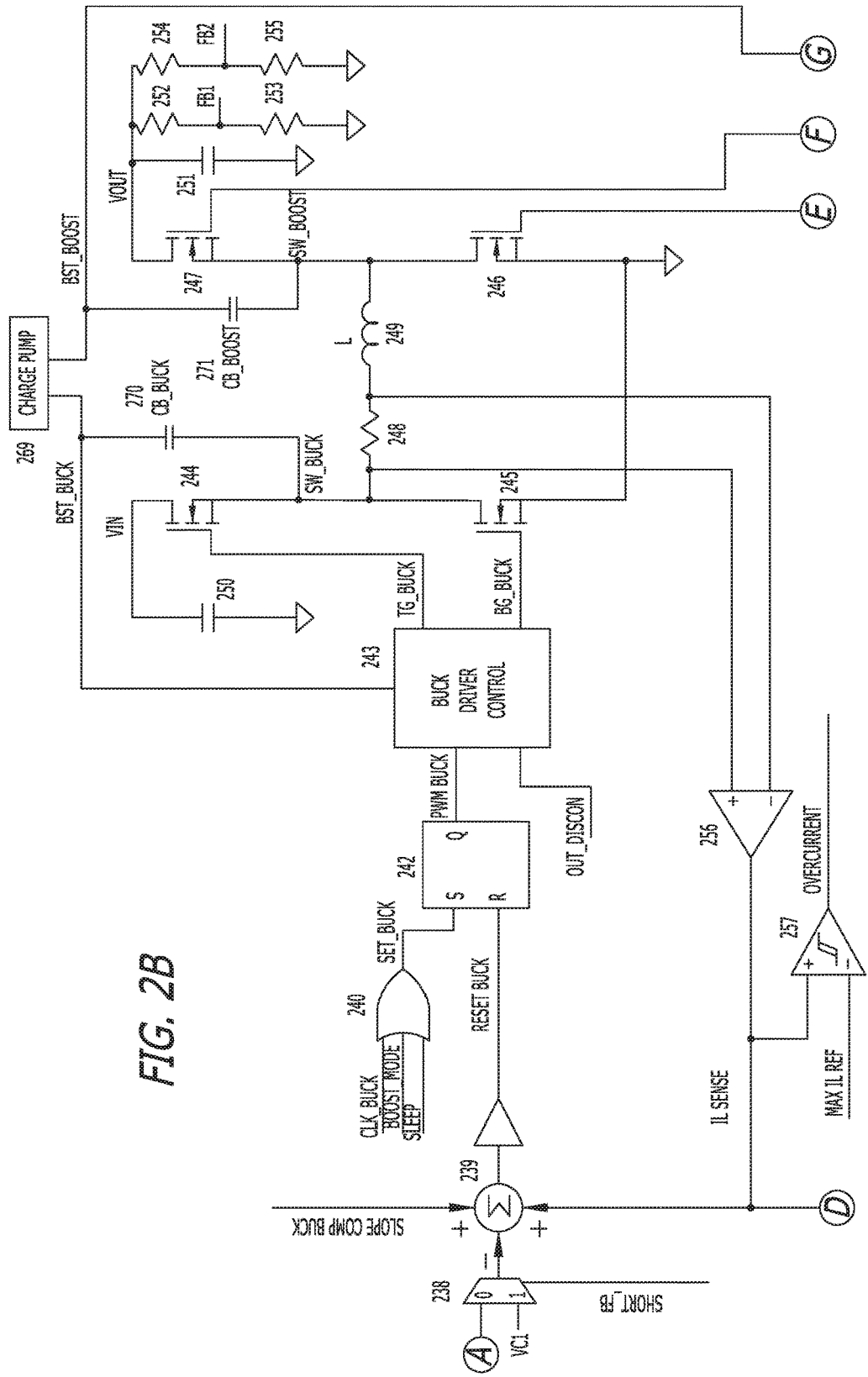
Figure 2C:
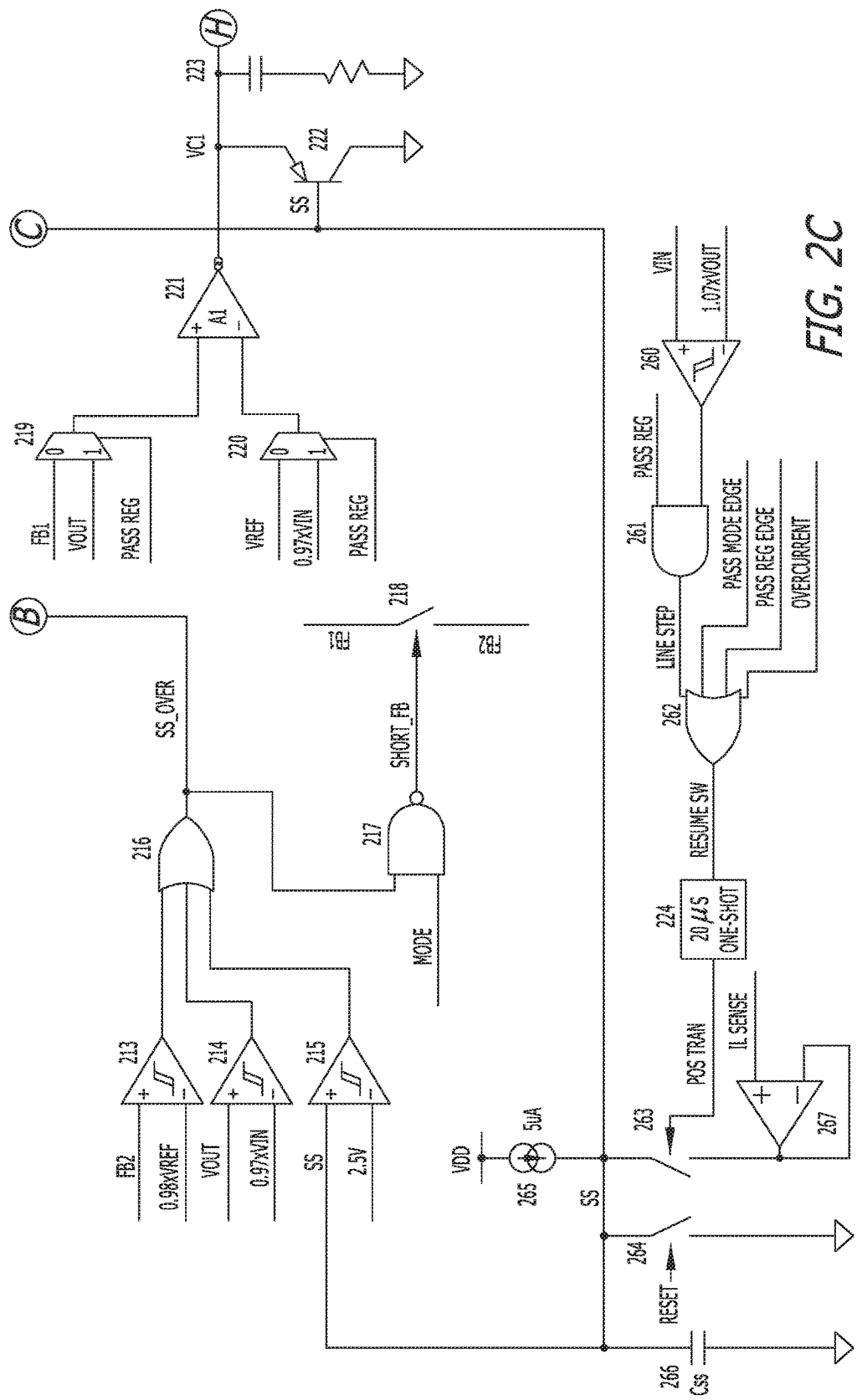
Figure 2D:
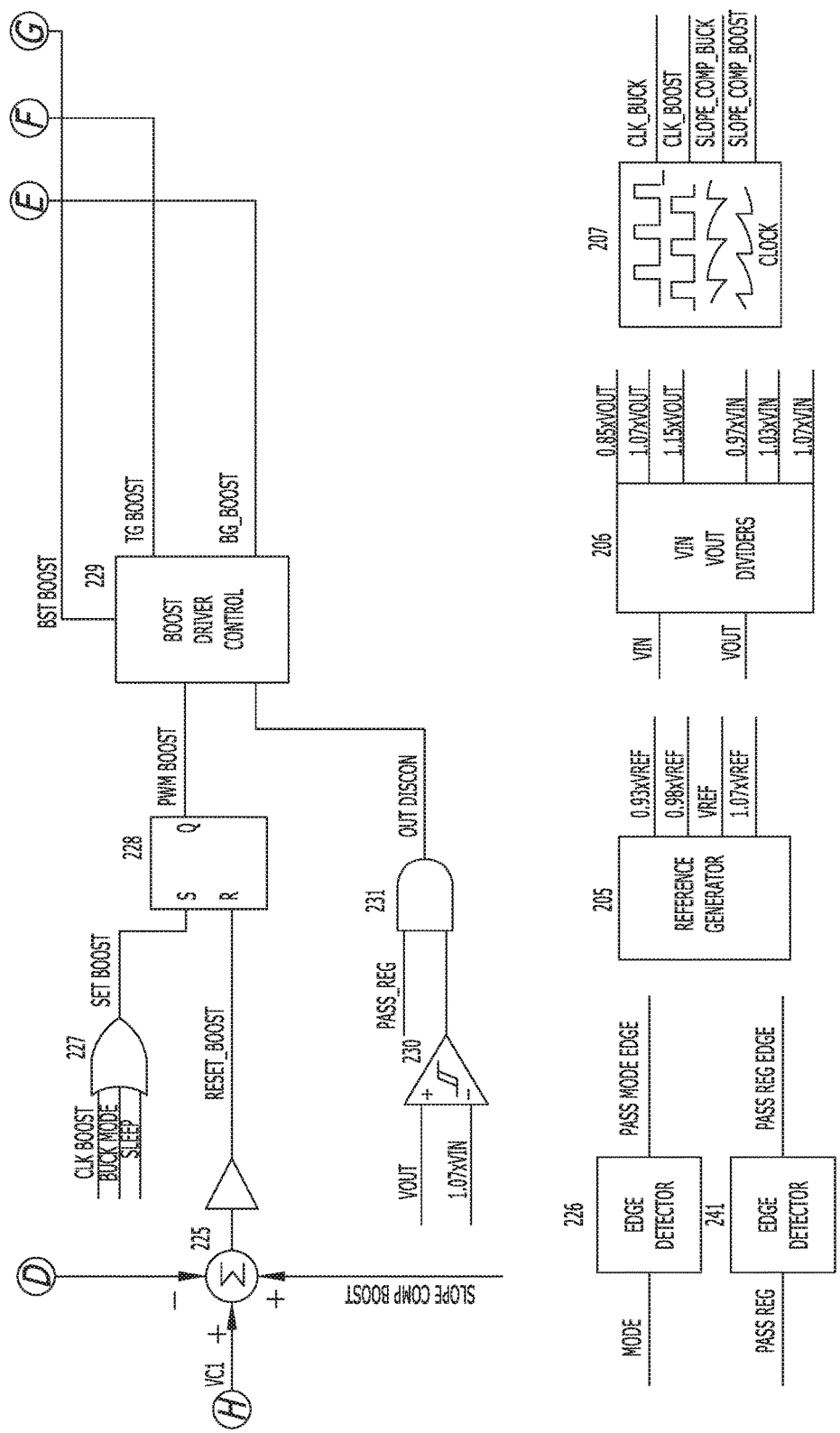

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Examples of pass through regulation of buck-boost regulators will now be described. A 4-switch buck-boost regulator with a pass-through mode may be used. Output voltage may be regulated to a window defined by a programmable minimum and maximum value. A controller may maintain regulation for input voltages above, below, and within an output voltage window. When the input is above the window, the buck regulator may maintain output at a maximum set value. When the input is below the window, the boost regulator may maintain output at a minimum set value. When the input voltage is in the vicinity of the boundaries of the pass window, 4-switch buck-boost operation may take place to regulate output to minimum/maximum value and avoid pulse-skipping. When the input is within the window, switching losses may go to zero and the input may be passed directly to the output through the inductor by turning the two top switches on continuously. Within the pass-through window, the inductor voltage, or input and output voltage, and current, or input or output current, may be monitored and switching may be resumed when a large voltage (either positive or negative) develops across the inductor or the inductor current exceeds a positive or negative current limit threshold. The non-switching pass-through state may be re-entered once the inductor voltage and current have once again settled within preset limits. The regulator can transition between pass-through window regulation to conventional fixed output regulation during operation using a mode selection input signal.

These approaches may have one or more advantages. No switching in the pass-through window may mean no switching losses, leading to higher efficiency from very light load to maximum output current. No switching in the pass-through window may mean no radiated or conducted EMI. The regulator supply current can drop from tens of milli-amps to microamps in the non-switching state because of the zero gate drive current, and because high supply current blocks (e.g. oscillator, current mode comparators) can be disabled. The pass-through window may improve buck and boost efficiency by limiting minimum buck and maximum boost duty cycles. The wider the window, the smaller the range of duty cycles and the lower the dissipated power. The non-switching state may allow further optimization by prioritizing Rds(on) over gate charge (Qg) when selecting power MOSFETs, as dissipated power may be due almost entirely to conduction losses. Inductor current may be monitored and controlled in the pass-through window when a positive or negative voltage develops across the inductor due to a line or load transient. This approach may mitigate large amplitude ringing of the current and output voltage and may keep currents low in the presence of large positive and negative line transients. It may also allow the pass-through window to be arbitrarily large. Reverse current can be detected and limited. As the buck and boost loops may switch when necessary within the pass-through window, the output voltage and inductor current can be controlled throughout the entire start up when the input voltage resides within the pass-through window. Similarly, in response to a line transient or a change of operating modes, any charging or discharging of output voltage within the pass-through window can be controlled with coordinated switching between the buck and boost regulation loops.

These approaches can transition between pass-through regulation and conventional fixed output voltage buck-boost regulation during operation. Efficiency and low noise can be traded for tighter output tolerance and improved transient response as the conditions in the application change.

FIG. 1 compares an example of conventional buck-boost operation on the left with an example of pass-through regulation on the right. A conventional buck-boost regulator on the left may regulate the output voltage to a preset value whether the input voltage is above, below or equal to the output voltage. The conventional buck-boost regulator may have three distinct switching regions that are determined by the relationship between the input and output voltage. When the input voltage is substantially below the output voltage, the regulator may reside in the boost region where the buck top switch is continually on and the buck bottom switch is off while the boost top and bottom switches toggle, acting as a synchronous boost regulator. When the input voltage is substantially above the output voltage, the regulator may reside in the buck region where the boost top switch is continually on and the boost bottom switch is off while the buck top and bottom switches toggle, acting as a synchronous buck regulator. When the input voltage is within a predetermined window around the output voltage, the regulator may reside in the buck-boost region where both the buck and boost top and bottom switches toggle in order to maintain regulation of the output voltage at the preset value without resorting to pulse skipping to achieve duty cycles very near 100%. The pass-through regulator on the right may regulate the output voltage to a window defined by a maximum value, VOUT_BUCK, and a minimum value, VOUT_BOOST. When the input voltage is substantially below the VOUT_BOOST the regulator may reside in the boost region where the buck top switch is on continually and the buck bottom switch is off while the boost top and bottom switches toggle, acting as a synchronous boost regulator, regulating the output voltage to VOUT_BOOST. When the input voltage is within a predetermined window below or around VOUT_BOOST, the regulator may reside in a buck-boost region where both the buck and boost top and bottom switches toggle in order to maintain regulation of the output voltage at VOUT_BOOST without resorting to pulse skipping. When the input voltage is substantially above VOUT_BUCK, the regulator may reside in the buck region where the boost top switch is on continually and the boost bottom switch is off while the buck top and bottom switches toggle, acting as a synchronous buck regulator, regulating the output voltage to VOUT_BUCK. When the input voltage is within a predetermined window above or centered around VOUT_BUCK, the regulator may reside in a buck-boost region where both the buck and boost top and bottom switches toggle in order to maintain regulation of the output voltage at VOUT_BUCK without resorting to pulse skipping. When the input voltage is greater than VOUT_BOOST and less than VOUT_BUCK, the regulator may reside in the pass-through window where the output will follow the input voltage. The buck and boost top switches may turn on continually, and the bottom switches off in this region when the inductor current and voltage settle within predetermined windows.

FIGS. 2A-D illustrate an example of a buck-boost regulator and a controller that implements pass through regulation of the buck-boost regulator.

The various components that are illustrated in FIGS. 2A-D may function as now described. Other components or arrangement of components may be used instead.

A comparator 200 may produce an output signal BUCK_MODE that goes high in response to the input voltage VIN being greater than 1.15× the output voltage VOUT. When BUCK_MODE is high, the controller may operate in the buck region where power switches 244 and 245 toggle on and off acting a synchronous buck regulator, while switch 247 is on continuously and switch 246 is off.

A comparator 201 may produce an output signal BOOST_MODE that goes high in response to the input voltage being less than 0.85× the output voltage. When BOOST_MODE is high, the controller may operate in the boost region where power switches 246 and 247 toggle on and off acting a synchronous boost regulator, while the switch 244 is on continuously and the switch 245 is off.

A comparator 202 may produce an output signal BUCK_SLEEP that goes high in response to the output VC2 of a buck error amplifier 234 exceeding a threshold, such as 2.5V.

The comparator 203 may produce an output signal BOOST_SLEEP that goes high in response to the output VC1 of a boost error amplifier 221 being lower than a threshold, such as 0.2V.

A two-input AND logic gate 204 may produce an output signal SLEEP that goes high in response to BUCK_SLEEP and BOOST_SLEEP inputs simultaneously being high. The SLEEP signal may force the switch 244 on continuously and the switch 245 off via a BUCK DRIVER CONTROL 243, an SR latch 242, and a 3-input OR gate 240. The SLEEP signal may also forces the switch 247 on continuously and the switch 246 off via a BOOST DRIVER CONTROL 229, an SR latch 228, and a 3-input OR gate 227.

A reference generator 205 may be used to create a system reference VREF for targeting output voltage regulation. Other scaled versions of the reference (e.g., 0.93×VREF, 0.98×VREF, 1.07×VREF) may be used as input signals for comparators 208, 209, and 213.

VIN, VOUT dividers 206 may generate scaled versions of the input and output voltage, which may be used as input signals for comparators 200, 201 214, 230 and inputs for the buck and boost error amplifiers via analog muxes 219, 220, 232, and 233.

A clock 207 may generate a switching clock for the buck loop CLK_BUCK which may initiate a buck switching period by setting the output PWM_BUCK of the SR latch 242, high and causing the BUCK DRIVER CONTROL 243 to turn on the buck top switch 244 at the beginning of the switching cycle. The clock 207 may also generate a switching clock for the boost loop CLK_BOOST, which may initiate the boost switching period by setting the output PWM_BOOST of the SR latch 228 high and cause the boost driver control 229 to turn on the boost top switch 247 at the beginning of the switching cycle. The clock may also generate the slope compensating ramps SLOPE_COMP_BUCK and SLOPE_COMP_BOOST which may be inputs to buck and boost current mode comparators 239 and 225 and used to stabilize the current mode control loop for switching duty cycles greater than 50%.

The comparator 208 may produce an output signal VIN_TOP that goes high in response to FB2 voltage on a resistor 255 being less than 0.93×VREF. This signal may be used to determine whether the input voltage is less than the top of the pass-through window which may be programmed through the FB2 resistive divider 254 and 255 between the output VOUT and ground.

The comparator 209 may produce an output signal VIN_BOTTOM that goes high in response to the FB1 voltage on the resistor 253 being greater than 1.07×VREF. This signal may be used to determine whether the input voltage is greater than the bottom of the pass-through window which may be programmed through the FB1 resistive divider 252 and 253 between the output VOUT and ground.

A 3-input AND logic gate 210 may produce an output that goes high in response to the VIN_TOP signal being high (indicating that the input voltage is less than the top of the pass-through window), the VIN_BOTTOM signal being high (indicating that the input voltage is greater than the bottom of the pass-through window), and the MODE signal being high (indicating that the part is configured to operate in pass-through mode).

A 2-input OR logic gate 211 may produce an output that goes high in response to either the BUCK_MODE or BOOST_MODE signals being high. When the output of this gate is low, it may indicate that the input voltage is within 15% of the output voltage.

A 3-input AND gate 212 may produce an output that goes high in response to the outputs of logic gates 210, and 216 being high and 211 being low, indicating that the regulator is not in buck or boost mode (gate 211), the regulator is configured for pass-through operation while the input voltage is between the bottom and top of the pass-through window (gate 210), and the soft-start routine has completed (gate 216). The output of this gate PASS_REG may change the inputs of the buck error amplifier 234 from FB2, VREF to VOUT, 1.03×VIN via analog muxes 232 and 233. This may cause the buck loop to regulate the output voltage to 1.03×VIN. Similarly, the inputs of the boost error amplifier 221 may be changed from FB1, VREF to VOUT, 0.97×VIN via analog muxes 219 and 220. This may cause the boost loop to regulate the output voltage to 0.97×VIN.

The comparator 213 may generate an output signal that goes high in response to the FB2 voltage exceeding 0.98× VREF, indicating that the FB2 voltage is greater than 98% of the value programmed via the FB2 resistive divider 254 and 255.

The comparator 214 may generate an output signal that goes high in response VOUT exceeding 0.97×VIN, indicating that the output voltage is greater than 97% of the input voltage.

A comparator 215 may generate an output signal that goes high in response to the voltage on the SS node exceeding 2.5V.

The 3-input OR logic gate 216 may generate an output signal SS_OVER, that indicates that the soft-start routine that controls turn on has completed. When the MODE input is high to select pass-through mode, and the SS_OVER signal is high, the SHORT_FB signal from a 2-input NAND logic gate 217 may go low, causing the FB1 and FB2 nodes to be disconnected, allowing the buck and boost loops to target separate output voltage targets for regulation, the top and bottom of the pass-through window, respectively.

The 2-input NAND logic gate 217 may generate an output signal SHORT_FB that enables a switch connecting the FB1 and FB2 voltages in response to either of its input signals MODE and SS_OVER being low. At startup, or when the controller is not configured for pass-through mode, the FB1 and FB2 nodes may be connected, causing the buck and boost regulation loops to target the same output voltage which is set by the parallel combination of the FB1 and FB2 resistive dividers 252, 253, 254, and 255.

A low resistance switch 218 may connect the FB1 and FB2 nodes when the SHORT_FB signal is high.

The analog mux 219 may pass the FB1 signal to its output when the controlling signal PASS_REG is low. It may pass the VOUT signal to its output when PASS_REG is high. The output may be connected to the positive input of the boost error amplifier 221.

The analog mux 220 may pass the VREF signal to its output when the controlling signal PASS_REG is low. It may pass the 0.97×VIN signal to its output when PASS_REG is high. The output may be connected to the negative input of the boost error amplifier 221.

The inputs of the boost error amplifier 221 may determine what the boost loop output voltage regulation target is. When PASS_REG is low, the boost loop may attempt to regulate the FB1 voltage to the internal reference, VREF. When PASS_REG is high, the boost loop may attempt to regulate the VOUT voltage to 0.97×VIN.

A boost soft-start clamp PNP transistor 222 may clamp the output of the boost error amplifier 221 to a diode voltage above the voltage on a Css capacitor 266. During soft-start, the voltage on Css may increase slowly with a charging current 265. The VC1 voltage may ramp in similar fashion, causing the inductor current to ramp in a similar fashion.

A boost error amplifier 221 output compensation network 223 may be used to stabilize the boost regulation loop.

A 20 microsecond one-shot logic gate 224 may generates a 20 us pulse on its output POS_TRAN in response to an input signal from the output of OR gate 262 transitioning from low to high.

The boost current mode comparator 225 may sum the output signal of the boost error amplifier 221 and the boost slope compensation ramp SLOPE_COMP_BOOST, and compare that sum against sensed inductor current IL_SENSE from 256. Output signal RESET_BOOST may go high when the sensed inductor current falls below the sum causing the on-time of the boost top switch 247 to terminate via the SR latch 228 and the BOOST DRIVER CONTROL 229.

The 3-input OR logic gate 227 may produce an output signal SET_BOOST that goes high in response to either the CLK_BOOST, BUCK_MODE, or SLEEP signals being high. When the SET_BOOST signal is high, the output PWM_BOOST of the SR latch 228 may cause the top switch 247 of the boost power stage to be on via the BOOST DRIVER CONTROL 229. CLK_BOOST may initiate the switching period during boost regulation. The on-time of the boost top switch 247 may terminate when the output RESET_BOOST of the boost current mode comparator 225 goes high. When BUCK_MODE or SLEEP inputs are high, the switch 247 may be on continuously, and the switch 246 may be off continuously.

The output PWM_BOOST of the boost SR latch 228 may be set high via the SET_BOOST signal going high. This may cause the boost top switch 247 to be on and the bottom switch 246 to be off via the BOOST DRIVER CONTROL 229. When the RESET_BOOST input goes high, this may cause the PWM_BOOST to go low, causing the boost top switch 247 to be off and the bottom switch 246 to be on via the BOOST DRIVER CONTROL 229.

When the input signal PWM_BOOST of the BOOST DRIVER CONTROL 229 is high, this may cause the TG_BOOST signal to be high, causing the boost top switch 247 to conduct and the BG_BOOST signal to be low causing the bottom switch 246 to be off. When the BOOST DRIVER CONTROL input signal PWM_BOOST is low, this may cause the TG_BOOST signal to be low, causing the boost top switch 247 to be off and the BG_BOOST signal to be high, causing the bottom switch 246 to conduct.

The comparator 230 may provide an output that indicates that the output voltage VOUT exceeds the input voltage VIN by 7% or more.

A 2-input AND logic gate 231 may produce an output OUT_DISCON that goes high when both of its input signals PASS_REG and the output of comparator 230 are high. The OUT_DISCON may indicate that the output voltage exceeds the input voltage by 7% while operating in the pass-through window. When the OUT_DISCON signal is high, the BUCK DRIVER CONTROL 243 may cause the switch 245 to be on and the switch 244 to be off. Similarly, when the OUT_DISCON signal is high, the BOOST DRIVER CONTROL 229 may cause the switches 246 and 247 to both be off. The purpose of this signal may be to disconnect the output from the input when the output voltage is sufficiently higher than the input voltage to prevent the inductor current from reversing direction while in pass-through regulation.

The analog mux 232 may pass the FB2 signal to its output when the controlling signal PASS_REG is low. It may pass the VOUT signal to its output when PASS_REG is high. The output may be connected to the positive input of the buck error amplifier 234.

The analog mux 233 may pass the VREF signal to its output when the controlling signal PASS_REG is low. It may pass the 1.03×VIN signal to its output when PASS REG is high. The output may be connected to the negative input of the buck error amplifier 234.

The inputs of the buck error amplifier 234 may determine what the buck loop output voltage regulation target is. When the buck loop is switching negative feedback may tend to force the positive and negative inputs of the error amplifier to be equal. When PASS_REG is low, the buck loop may attempt to regulate the FB2 voltage to the internal reference VREF. When PASS_REG is high, the buck loop may attempt to regulate the VOUT voltage to 1.03×VIN.

A buck soft-start clamp PNP transistor 235 may cause the output of the buck error amplifier 234 to track the voltage on the Css capacitor 266 during soft-start to control in rush current. When transitioning from the non-switching state where both top switches 244 and 247 are continually on to active switching, the voltage on Css may be forced to a value which may be a function of the sensed inductor current IL_SENSE via a buffer amplifier 267. The primary purpose of this may be to cause the VC2 voltage to be pulled below 2.5V, causing the output of the comparator 202 BUCK_SLEEP to go low, causing the controller to exit sleep mode thereby exiting the non-switching state. A secondary purpose may be to drive the voltage on the output of the buck error amplifier to a value which will cause the inductor current to preserve value it had in the non-switching state after switching commences. In this way, the inductor current may be preserved at its previous value and the perturbation to the output voltage minimized.

An output compensation network 236 connected to the output of the buck error amplifier 234 may be used to stabilize the buck regulation loop.

An analog mux 238 may pass the VC1 signal to its output when the controlling signal SHORT_FB is high. It may pass the VC2 signal to its output when SHORT_FB is low. This may cause the buck and boost loops to share a common error amplifier 221 and control signal VC1 when the MODE pin is low or when the soft-start routine has not completed.

The buck current mode comparator 239 may sum the output signal of an analog mux 238 and the buck slope compensation ramp SLOPE_COMP_BUCK, and compare this sum against the sensed inductor current IL_SENSE from 256 to control the duty cycles of the buck top and bottom switches 244 and 245. Output signal RESET_BUCK may go high when the sensed inductor current exceeds the sum causing the on-time of the buck top switch 244 to terminate its on-time via the SR latch 242 and the BUCK DRIVER CONTROL 243.

The 3-input OR logic gate 240 may produce an output signal SET_BUCK may go high in response to either the CLK_BUCK, BOOST_MODE, or SLEEP signals being high. When the SET_BUCK signal is high, the output PWM_BUCK of the SR latch 242 may cause the top switch of the buck power stage 244 to be on via the BUCK DRIVER CONTROL 243. CLK_BUCK may initiate the switching period during buck regulation and the on-time of the buck top switch 244 may be terminated when the output RESET_BUCK of the buck current mode comparator 239, goes high. When the BOOST_MODE or SLEEP inputs are high, the switch 244 may be on continuously, while the switch 245 is off.

When the output PWM_BUCK of the buck SR latch 242 is set high via the SET_BUCK signal going high, this may cause the buck top switch 244 to be on and the bottom switch 245 to be off via the BUCK DRIVER CONTROL 243. When the RESET_BUCK input goes high, this may cause PWM_BUCK to go low, causing the buck top switch 244 to be off and the bottom switch 245 to be on via the BUCK DRIVER CONTROL 243.

The buck power stage top switch 244 may connect the input voltage VIN to the SW BUCK node when on.

The buck power stage bottom switch 245 may connect the SW_BUCK node to ground when on.

The boost power stage bottom switch 246 may connect the SW_BOOST node to ground when on.

The boost power stage top switch 247 may connect the output voltage VOUT to the SW BOOST node when on.

The voltage across a current sense resistor 248 may be proportional to the current flowing through an inductor 249. The voltage across the current sense resistor 248 may be an input signal to the current sense amplifier 256 whose output may be used for current mode control (via comparators 225 and 239) and maximum current limiting via the over-current detection comparator (257).

An input capacitor 250 may be used to filter time-varying input current while switching.

The output capacitor 251 may be used to filter time-varying output current while switching.

There may be an FB1 divider top resistor 252, an FB1 divider bottom resistor 253, an FB2 divider top resistor 254, and an FB2 divider bottom resistor 255.

A comparator 260 may provide an output that indicates that the output voltage VIN exceeds the input voltage VOUT by 7% or more.

A 2-input AND logic gate 261 may produce an output LINE_STEP that goes high when both of its input signals PASS_REG and the output of the comparator 260 are high. The LINE_STEP signal may indicates that the input voltage exceeds the output voltage by 7% or more while operating in the pass-through window.

The 4-input OR logic gate 262 may produce an output RESUME_SW that goes high when any of its input signals LINE_STEP, PASS_MODE_EDGE, PASS_REG_EDGE, or OVERCURRENT are high. When the RESUME_SW signal transitions from low to high, this may cause the output of the 20 us one-shot 224 to output a 20 us long pulse, POS_TRAN. When the POS_TRAN signal goes high the voltage on Css capacitor 266 may be buffered to a voltage which pulls the VC2 node below 2.5V, causing SLEEP signal to go low via the comparator 202 and AND gate 204, exiting the non-switching state where both top switches 244 and 247 are on. The voltage forced on the VC2 node may cause the average switching current in the inductor 249 to be substantially equal to the average measured current just prior to switching. The POS_TRAN signal may smooth the transition from the non-switching state to switching state by minimizing any perturbation to the inductor current, and thereby the output voltage as well.

A switch 263 may connect the SS node to the output of buffer amplifier 267 when the controlling signal POS_TRAN is high.

A switch 264 may connect the SS node to the ground when the controlling input signal RESET is high, indicating that the controller is disabled.

The SS node pull-up current 265 may set the voltage ramp rate of the SS node with this current and the value of the soft-start capacitor Css capacitor 266 and may control the ramp rate of the inductor current at startup or after a POS_TRAN event via the clamping of the VC1 and VC2 voltages.

The voltage ramp rate of the soft-start capacitor 266 may be set with the value of this capacitor and SS pull up current 265 and may control the ramp rate of the inductor current at startup and after the POS_TRAN signal goes high.

The POS_TRAN buffer amplifier 267 may take the sensed inductor current signal IL_SENSE as an input and output a voltage onto the soft-start capacitor 266 that causes the voltage on the VC2 to be driven below 2.5V, causing SLEEP mode to be exited via the comparators 202 and AND gate 204, and may force switching to resume. The VC2 node may be forced to a voltage that tracks the sensed inductor current prior to the non-switching to switching transition that keeps the average inductor current substantially unchanged once switching begins. This may be needed because the VC2 node may move relatively slowly due to the error amplifier compensation network 236, and the inductor current could be substantially lower or higher than the non-switching value for the period of time required for the VC2 voltage to settle, causing the output voltage to fall or rise, respectively, undesirably.

A charge pump 269 may maintain the voltage on the buck and boost bootstrap capacitors 270 and 271 above a predetermined level in the pass-through non-switching state where both top switches 244 and 247 are on continuously.

Voltage across a buck bootstrap capacitor 270 CB_BUCK may power the top switch driver in the BUCK DRIVER CONTROL 243.

Voltage across a boost bootstrap capacitor 271 CB_BOOST may power the top switch driver in the BOOST DRIVER CONTROL 229.

The various components that have just been described may cooperate to perform other functions, as now described.

FIGS. 2A-D display a 4-switch buck-boost regulator which is formed through the joining of a buck power stage that may include switches 244 and 245 through the inductor 249 to a boost power stage that may include switches 246 and 247. The buck power stage may include the top switch 244 and the bottom switch 245. These switches may be turned on and off in response to the TG_BUCK and BG_BUCK signals generated in the BUCK_DRIVER_CONTROL 243. When the PWM_BUCK signal is high, it may cause the BUCK_DRIVER_CONTROL 243 to force the TG_BUCK signal high, which may cause the top switch 244 to conduct while simultaneously causing the BG_BUCK signal to be low, forcing the bottom switch 245 to be off. When the PWM_BUCK signal is low, the BUCK_DRIVER_CONTROL 243 may force the TG_BUCK low, causing the top switch 244 to be off and the BG_BUCK signal high, forcing the bottom switch 245 to conduct.

The duty cycle of the buck power stage may be regulated via a current mode control architecture. The current mode control circuitry may include the error amplifier 234 or 221, the current mode comparator 239, and the SR latch 242. While in regulation, negative feedback may force the inputs of the buck error amplifier 234 or 221 to be substantially equal.

The boost power stage may include the top switch 247 and the bottom switch 246. These switches may be turned on and off in response to the TG_BOOST and BG_BOOST signals generated in the BOOST_DRIVER_CONTROL 229. When the PWM_BOOST signal is high, the BOOST_DRIVER_CONTROL 229 may set the TG_BOOST signal high and the top switch 247 may conduct while causing the BG_BOOST signal to be low, forcing the bottom switch 246 to be off. When the PWM_BOOST signal is low, the BOOST_DRIVER_CONTROL 229 may force the TG_BOOST signal low, causing the top switch 247 to be off and the BG_BOOST signal high, forcing the bottom switch 246 to conduct.

The duty cycle of the boost power stage may be regulated via a current mode control architecture. The current mode control circuitry may include the error amplifier 221, the current mode comparator 225, and the SR latch 228. While in regulation, negative feedback may force the inputs of the boost error amplifier 221 to be substantially equal.

Two switching modes may be selected in this buck-boost regulator through a mode selection input signal MODE. When the MODE signal is low, the output may be regulated to a voltage that is defined by the parallel combination of the FB1 and FB2 resistive dividers 252,253, 254, and 255 between the output and ground and an internal voltage reference from the reference generator 205. The output may remain in regulation, whether the input voltage is above, below or equal to the output voltage. When the input voltage VIN is less than the output voltage VOUT by 15% or more, the output BOOST_MODE of the comparator 201 may go high, forcing the buck power stage into a static state where the buck top switch 244 is on continually and the buck bottom switch 245 is off. This may be accomplished through the BOOST_MODE signal setting the PWM_BUCK signal high via OR gate 240 and SR latch 242. In this boost regulation state, the control circuitry 221, 225, 227, 228, 229 may continue to force the duty cycle of the boost power stage so as to keep the inputs of the error amplifier 221 substantially equal.

Similarly, when the input voltage, VIN, is greater than the output voltage, VOUT by 15% or more, the output BUCK_MODE of the comparator 200 may go high, forcing the boost power stage into a static state where the boost top switch 247 is on continually and the boost bottom switch 246 is off. This may be accomplished through the BUCK_MODE signal setting the PWM_BOOST signal high via OR gate 227 and the boost SR latch 228 and 228. In this buck regulation state, the control circuitry 221, 239, 240, 242, and 243 may continue to force the duty cycle of the buck power stage, so as to keep the inputs of the error amplifier 221 substantially equal.

When VIN is within 15% of VOUT, both the BUCK_MODE and BOOST_MODE signals may be low, causing the regulator to reside in the buck-boost regulation state where both the buck and the boost power stages are actively switching. The control circuitry 221, 225, 227, 228, 229, 239, 240, 242, and 243 may continue to force the duty cycle of both the buck and boost power stages, so as to keep the inputs of the error amplifier 221 substantially equal.

The pass-through switching mode can be selected by setting the mode selection input signal MODE high. In pass-through mode, the output voltage may be regulated to a window with a top value defined the FB2 resistive divider 254 and 255 between VOUT and ground and a bottom value defined by the FB1 resistive divider 252 and 253 between VOUT and ground. When VIN is below the bottom of the defined window, the regulator may step up the input voltage to maintain the output voltage at the bottom of the window. When VIN is above the top of the defined window, the regulator may step down the input voltage to maintain the output voltage at the top of the window.

When the input voltage is within the window, the output voltage may track the input, and the top switches 244 and 247 of the buck and boost power stages may turn on continually once the output has settled within a defined window of the input voltage. Switching may resume in this window if the voltage across the inductor 249 or the current through it exceeds predetermined limits in order to limit or minimize those quantities.

At startup, switching may be enabled and the RESET signal may go low, disconnecting the switch 264 that connects the SS node to ground, allowing the SS voltage to ramp at a rate set by the soft-start charging current 265 and the soft-start capacitor 266. The output of the boost error amplifier 221 may track the voltage on the soft-start node via a clamping PNP transistor 222, holding the VC1 voltage to a diode voltage above the SS node voltage. In a current mode control switching regulator, the inductor current may track the voltage at the output of the error amplifier in a proportional relationship. The slow ramping of the VC1 voltage may cause the inductor current to ramp in a similar fashion. The limiting of in-rush current at startup may be referred to as "soft-start."

The startup sequence may be completed when either the SS node voltage exceeds 2.5V, the VOUT voltage is greater than 0.97×VIN, or the FB2 voltage is greater than 0.98× VREF. When the MODE signal is high (indicating pass-through operation) and the SS_OVER signal is low, the output SHORT_FB of gate 217 may be high, causing the FB1 and FB2 nodes to be connected through the low resistance switch 218. When the switch 218 conducts, FB1 and FB2 voltages may be substantially equal and the divider ratio may be set by the parallel combination of the FB1 divider resistors 252 and 253 and the FB2 resistor dividers 254 and 255.

When FB_SHORT is high, the buck error amplifier 234 may be bypassed with the analog mux 238 such that the signal sent to the buck current mode comparator 239 is the output VC1 of the boost error amplifier 221, rather than VC2. In this state, the buck and boost regulation loops may share a common error amplifier and both may target the output voltage that causes the inputs of the boost error amplifier 221 to be equal, whether the regulator operates in the buck, boost, or buck-boost regions.

The multiple inputs that can cause the SS_OVER signal to go high, the outputs of comparators 213, 214, and 215, cover the three cases of where the input voltage resides in relation to the pass-through window, either below, above, or within for determining that the soft-start routine has completed. If VIN is below the pass-through window, SS_OVER may go high once VOUT exceeds 0.97×VIN (comparator 214). If VIN is within or above the pass-through window, SS_OVER may go high once FB2 exceeds 0.98×VREF. The detection of the SS node voltage exceeding 2.5V (comparator 215) may be a watchdog timer that completes the soft-start routine long after the outputs of comparator 213 or 214 should have gone high. Once SHORT_FB signal goes low, the buck and boost loops may function independently with separate regulation targets and error amplifiers 234 and 221.

If the input voltage is above the top of the pass-through window, the buck control regulator may regulate the FB2 voltage to be substantially equal to the internal reference VREF, and VOUT may be regulated to the top of the pass-through window. If VIN is greater than 15% or more above the top of the pass-through window, the output BUCK_MODE of the comparator 200 may go high, causing the boost power stage to enter a non-switching state where top switch 247 is on continually and the bottom switch 244 is always off.

If VIN is less than 15% greater than the top of the pass-through window, both the buck and the boost loops may switch. In this buck-boost region just above the pass-through window, the duty cycle of the buck power stage switches 244 and 245 may be controlled to regulate the output voltage to the top of the pass-through window, whereas the boost power stage switches 246 and 247 may switch at a fixed duty cycle.

If the input voltage is below the bottom of the pass-through window, the boost regulator will regulate the FB1 voltage to be substantially equal to the internal reference VREF, and VOUT will be regulated to the bottom of the pass-through window. If VIN is less than the bottom of the pass-through window by than 15% or more, the output BOOST_MODE of the comparator 201 may go high, causing the buck power stage to enter a non-switching state where the top switch 244 is on continually and the bottom switch 245 is always off. If VIN is between the bottom of the pass-through window and 15% below that point, both the buck and the boost loops will switch.

In this buck-boost region just below the pass-through window, the duty cycle of the boost power stage switches 246 and 247 may be controlled via the current mode control circuitry 221, 225, 228, and 229 to regulate the output voltage, whereas the buck power stage switches 244 and 245 may switch at a fixed duty cycle.

While operating in the pass-through mode, the controller may determine whether the input voltage VIN lies between the top and the bottom of the pass-through window, defined with FB1 and FB2 resistor dividers 252,253,254, and 255. The boost regulation loop may target the output voltage to the bottom of the pass-through window. The boost loop may only be able to step up the output voltage from the input voltage (not step it down), and if VIN exceeds the bottom of the pass-through window, the output may follow it up. Once the input voltage (and therefore also the output voltage) is 7% higher than the bottom of the pass-through window, the output VIN_BOTTOM of the comparator 209 may go high.

The buck regulation loop may target the output voltage to the top of the pass-through window. The buck loop may only be able to step down the output voltage from the input voltage (not step it up). If VIN is below the top of the pass-through window, the output may follow it down. Once the input voltage (and therefore also the output voltage) is 7% lower than the top of the pass-through window, the output VIN_TOP of the comparator 208 may go high.

When both the VIN_TOP and VIN_BOTTOM signals from the comparators 208 and 209 are high, the MODE signal is high, the SS_OVER signal is high, and VIN is within 15% of VOUT from the comparators 200 and 201, the output signal of AND gate 214, PASS_REG may go high and the controller may be in pass-through regulation. In pass-through regulation the buck and boost current mode control circuitry may be repurposed by changing the inputs of the buck and boost error amplifiers 234 and 221. The positive input of the buck error amplifier 234 may be changed from FB2 to VOUT through the analog mux 232. The negative input of the buck error amplifier 234 may be changed from VREF to 1.03×VIN through the analog mux 233. The net effect is that the buck loop may target the output regulation voltage to 1.03×VIN, rather than to the top of the pass-through window when the PASS_REG signal is high.

As the buck loop cannot step up the output voltage, VOUT may settle at a voltage substantially equal to VIN and the output VC2 of the buck error amplifier 234 may be forced to its positive limit. The positive input of the boost error amplifier 221 may be changed from FB1 to VOUT through the analog mux 219. The negative input of the boost error amplifier 221 may be changed from VREF to 0.97× VIN through the analog mux 220. The net effect may be that the boost loop will target the output regulation voltage to 0.97×VIN, rather than to the bottom of the pass-through window when the PASS_REG signal is high.

As the boost loop cannot step down the output voltage, VOUT may settle at a voltage substantially equal to VIN and the output VC1 of the boost error amplifier 234 may be forced to its negative limit. The output signal BOOST_SLEEP of the comparator 203 may go high when VC1 drops below 200 mV, indicating that the output voltage is greater than 0.97×VIN. The output signal BUCK_SLEEP of the comparator 202 may go high when VC2 voltage exceeds 2.5V, indicating that the output voltage is less than 1.03× VIN. When both the BOOST_SLEEP and BUCK_SLEEP signals are high, indicating that the output voltage lies within 3% of the input voltage, the output of SLEEP the AND gate 204 may go high. The SLEEP signal may cause the controller to enter the non-switching state where the buck and boost top switches 244 and 247 are on continually, and the two bottom switches 245 and 246 are off through the OR gates, SR latches and driver control blocks 227, 228, 229 and 240, 242, and 243. The SLEEP signal may also be used to disable circuitry that is not necessary in the non-switching state, such as the clock 207 and the buck and boost current mode comparators 239 and 225 to reduce power dissipation.

While in the non-switching state, the buck and boost bootstrap capacitors 270 and 271 may will periodically be recharged with the charge pump 269 in order to provide sufficient voltage to power the BUCK_DRIVER_CONTROL 243 and the BOOST_DRIVER_CONTROL 229.

There are multiple conditions that could cause the controller to transition from the non-switching state to a switching state. These may include one or more or all of the following:

A line or load transient causes VOUT to be above 1.03×VIN while in pass-through regulation. This may cause the output VC2 of the buck error amplifier 234 to fall below 2.5V, causing the output BUCK_SLEEP of the comparator 202 to go low, causing the SLEEP signal to go low and exiting the non-switching state. Switching may be resumed and the buck loop may try to regulate the output to 1.03× VIN while the boost loop attempts to regulate the output to 0.97×VIN.

A line or load transient causes VOUT to be below 0.97×VIN while in pass-through regulation. This may cause the output VC of the boost error amplifier 221 to rise above 200 mV, causing the output BOOST_SLEEP of the comparator 203 to go low, causing the SLEEP signal to go low and exiting the non-switching state. Switching may be resumed and the buck loop may try to regulate the output to 1.03×VIN while the boost loop attempts to regulate the output to 0.97×VIN.

Large line or load transient causes VIN to be above 1.07×VOUT while in pass-through regulation. In the case of a large transient voltage across the inductor 249, the response time of error amplifiers may be too slow to adequately control the inductor current. The output of the comparator 260 may go high and feed into the AND gate 261, and that feeds into the OR gate 262 that feeds into the 20 microsecond one-shot 224 generating the POS_TRAN signal. The POS_TRAN signal may connect the SS node through the switch 263 to the output of the buffer amplifier 267, whose input signal may be the sensed inductor current IL_SENSE. The output of the buffer amplifier 267 may be scaled such that the voltage on the SS pin clamps transistor 235 and 222 the outputs VC2 and VC1 of the buck and boost error amplifiers 234 and 221 to the approximate value to maintain the average inductor current at the value it had prior to the non-switching to switching transition. Prior to the transition, the output of the buck error amplifier 234 output, VC2, sits at is positive limit, greater than 2.5V, and the boost error amplifier 221 output, VC1, sits at its negative limit, less than 200 mV. As the inductor current in a current mode controlled regulator tracks the output of the error amplifiers in a proportional manner the buck error amplifier 234 would tend to command the inductor current to its maximum value whereas the boost error amplifier 221 would tend to command the inductor current to its minimum value when switching begins. The time required for the VC1 and VC2 voltages to stabilize to program the inductor current appropriately to regulate the VOUT voltage may be considerable and is a function of the error amplifier transconductance, current drive and the components selected for the error amplifier compensation networks, 123 and 136. A sudden increase in the inductor current due to a high error amplifier output voltage at the point switching commences would lead to an overshoot on the output voltage VOUT. A sudden decrease in the inductor current due to a low error amplifier output voltage at the point switching commences would lead to an undershoot on the output voltage VOUT. By measuring the inductor current using sense resistor 248 and amplifier 256 and then scaling and buffering that voltage onto the error amplifier outputs VC1 and VC2 using amplifier 267 and PNP clamps 222 and 235 when the POS_TRAN pulse is issued, the buck and the boost loops can be maintain the switching inductor current at substantially the same value as the non-switching current. Once switching begins, the inductor current may ramp along with the voltage on the SS node due to PNP clamps 222 and 235, and the output may rise towards the input voltage in a manner similar to soft-start. Once the output voltage is greater than 0.97×VIN, the regulator may once again enter the non-switching state.

Large line or load transient causes VOUT to be above 1.07×VIN while in pass-through regulation. In the case of a large transient voltage across the inductor 249, the response time of error amplifiers may be too slow to adequately control the inductor current. The output of the comparator 230 may go high and feed into the AND gate 231 whose output signal OUT_DISCON feeds into the DRIVER_CONTROL_BUCK 243 and the DRIVER_CONTROL_BOOST 229. In response to OUT_DISCON going high, DRIVER_CONTROL_BOOST may force both TG_BOOST and BG_BOOST signals low, turning off the boost top switch 247 and bottom switch 246. The DRIVER_CONTROL_BUCK may force TG_BUCK signal low and BG_BUCK high so that the buck bottom switch 245 conducts while the top switch 244 is off. The net effect of this static switch configuration is that the output is disconnected from the regulator and the inductor is discharged. Once the output voltage has discharged sufficiently that the output of the comparator 230 is low, switching may resume and the buck loop may try to regulate the output to 1.03×VIN while the boost loop attempts to regulate the output to 0.97×VIN.

VIN rises above the top of the pass-through window, VOUT follows it causing the FB2 pin to exceed 0.93×VREF, causing the VIN_TOP signal at the comparator 208 to go low and pass-through regulation to be exited at the AND gate 212. In this case, the positive and negative inputs of the buck error amplifier 234 may revert back to FB2 and VREF, respectively, and the buck loop may regulate the output to the top of the pass-through window. The edge detector circuit 258 may monitor the PASS_REG signal and issue an output pulse PASS_REG_EDGE whenever the PASS_REG signal transitions from high to low. The PASS_REG_EDGE signal is input to the gate 262 and may cause a POS_TRAN pulse to be issued, smoothing the non-switching to switching transition by minimizing perturbation of the inductor current.

VIN falls below the bottom of the pass-through window, VOUT follows it causing the FB1 pin to drop below 1.07×VREF, causing the VIN_BOTTOM signal at the comparator 209 to go low and pass-through regulation to be exited at the gate 212. In this case, the positive and negative inputs of the boost error amplifier 234 may revert back to FB1 and VREF, respectively, and the boost loop may regulate the output to the bottom of the pass-through window. The edge detector circuit 258 may monitor the PASS_REG signal and issues an output pulse PASS_REG_EDGE whenever the PASS_REG signal transitions from high to low. The PASS_REG_EDGE signal may be input to the gate 262 and cause a POS_TRAN pulse to be issued, smoothing the non-switching to switching transition by minimizing perturbation of the inductor current.

The MODE signal goes from high to low. This may causes the output of the gate 217 to go high, shorting the FB1 and FB2 nodes, collapsing the pass-through window and causing the PASS_REG signal to go low. This situation may be similar to startup in that the output voltage regulation target is set by the parallel combination of the FB1 and FB2 resistor dividers 252,252,254, and 255 and that the buck and boost loops may use the single error amplifier 221 and target the output to the same value. The edge detector circuit 257 may monitor the MODE signal and issues a output pulse PASS_MODE_EDGE whenever the MODE signal transitions from high to low. The PASS_MODE_EDGE signal may be input to the gate 262 and cause a POS_TRAN pulse to be issued, smoothing the non-switching to switching transition by minimizing perturbation of the inductor current.

The sensed inductor current IL_SENSE at the resistor 248 exceeds a preset maximum value, MAX_IL_REF, causing the output of the comparator 257, OVERCURRENT to go high. The OVERCURRENT signal may be input to the gate 262 and cause a POS_TRAN pulse to be issued, smoothing the non-switching to switching transition by minimizing perturbation of the inductor current.

Figure 3:
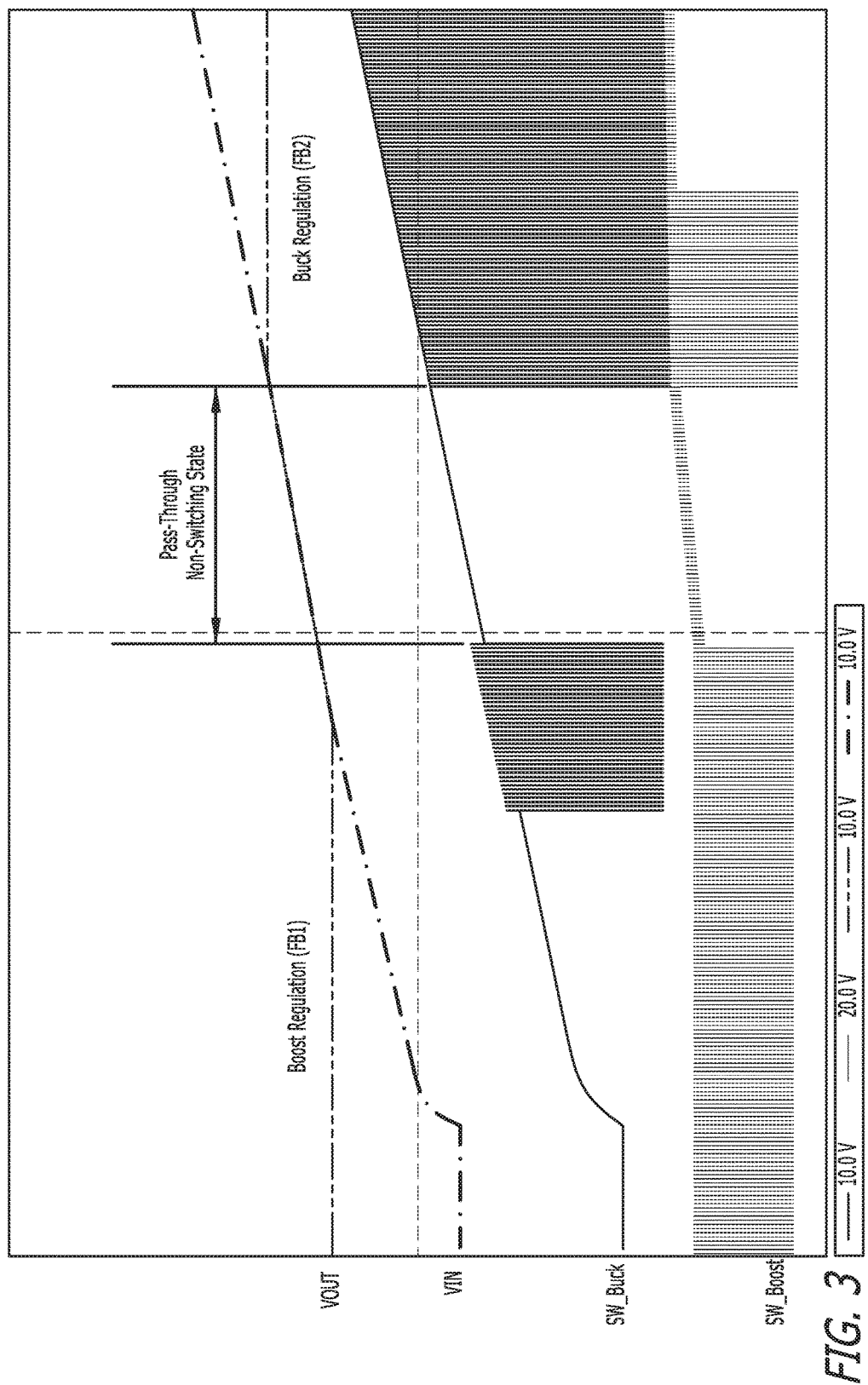
FIG. 3 illustrates an example of pass-through operation of an ADI LT8210 with VIN sweep.

FIG. 3 illustrates an example of pass-through operation of a ADI LT8210 with VIN sweep. In this application, the minimum output voltage of the pass-through window is set at 19V and the maximum set at 29V. The VIN voltage is initially powered with 5V with respect to ground and that voltage is ramped to 37V over the course of 18 ms. As the VIN voltage increases, each switching region of pass-through operation can be seen. When VIN is less than 16.15V, SW_BUCK is continuously high and only the SW_BOOST toggles indicating that the regulator is in the boost regulation mode, the output voltage is regulated to the minimum of the pass-through window, 19V, in this region. As VIN increases beyond 85% of the bottom of the pass-through window, the regulator enters the buck-boost region where both SW_BUCK and SW_BOOST nodes toggle at the switching frequency, regulating VOUT at 19V. As VIN exceeds 20.33V, 7% above the bottom of the pass-through window, the regulator enters the non-switching pass-through state with SW_BUCK and SW_BOOST continually high; VOUT is substantially equal to VIN in this region. Once VIN exceeds 27V, 7% below the top of the pass-through window, the regulator exits the non-switching state and enter the buck-boost region just above the pass-through region where both SW_BUCK and SW_BOOST nodes toggle and VOUT is regulated to 29V. Once VIN exceeds 33.3V, the regulator enters the buck region and the SW_BOOST node goes high continually, SW_BUCK toggles and VOUT is regulated to 29V.

Figure 4:
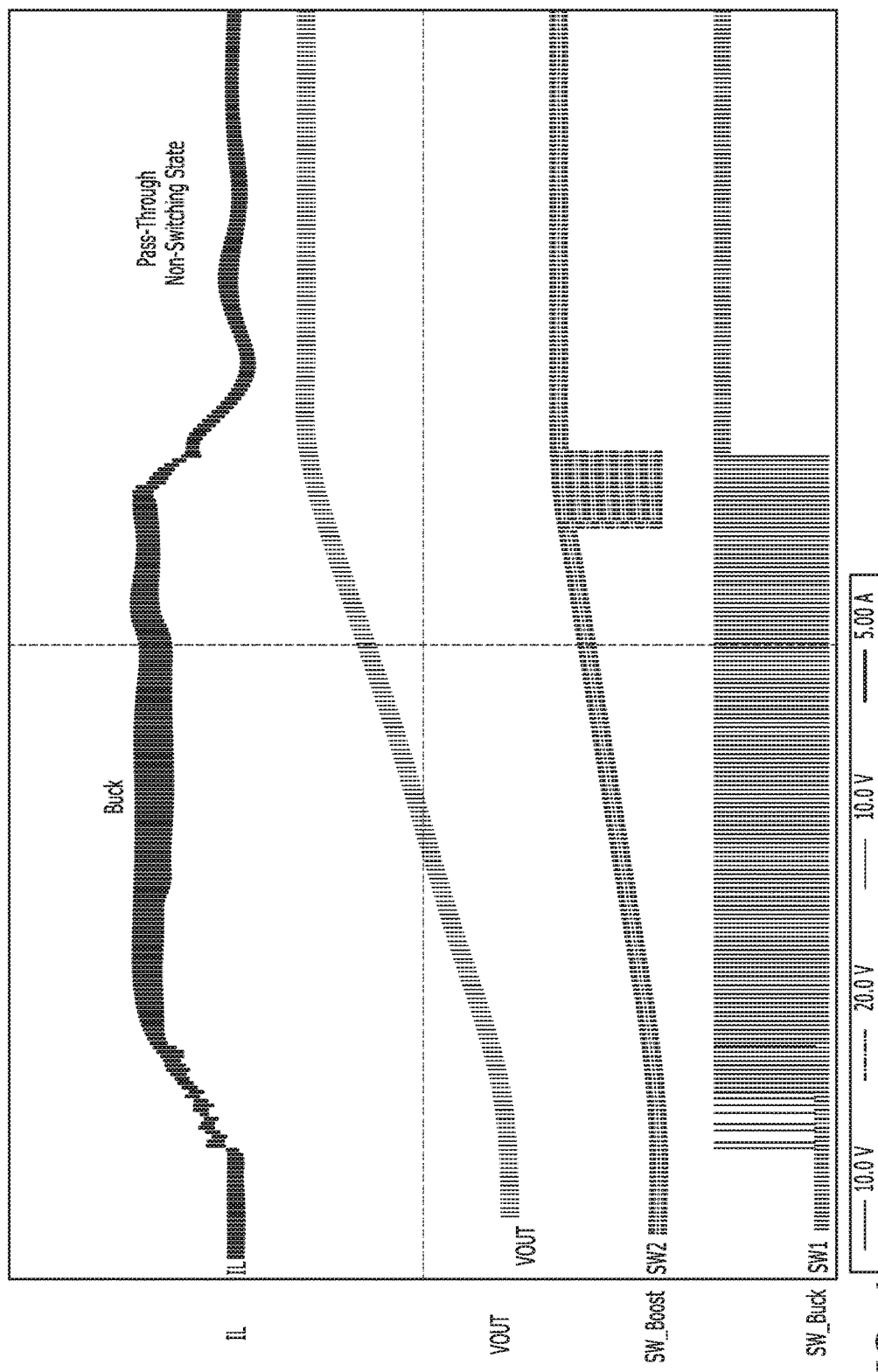
FIG. 4 illustrates an example of pass-through startup.

FIG. 4 illustrates an example of the ADI LT8210 startup while configured for pass-through mode. VOUT is initially discharged to 0V causing the regulator to start in the buck region once switching is enabled. SW_BOOST is continuously high in this region and SW_BUCK toggles at the switching frequency. The inductor current, IL, initially ramps in a linear fashion from zero tracking the voltage on the soft-start capacitor (signal not shown) and eventually reaching its maximum average value of 5A. VOUT is charged until it reaches 22V at which point the regulator enters the buck-boost region and both the SW_BUCK and SW_BOOST nodes toggle at the switching frequency. VOUT continues to rise in this region until it exceeds 23.5V (98% of the VIN voltage) at which point the start up routine is completed and the regulator transitions to pass-through regulation and enters the non-switching state with SW_BUCK and SW_BOOST continually high.

Figure 5:
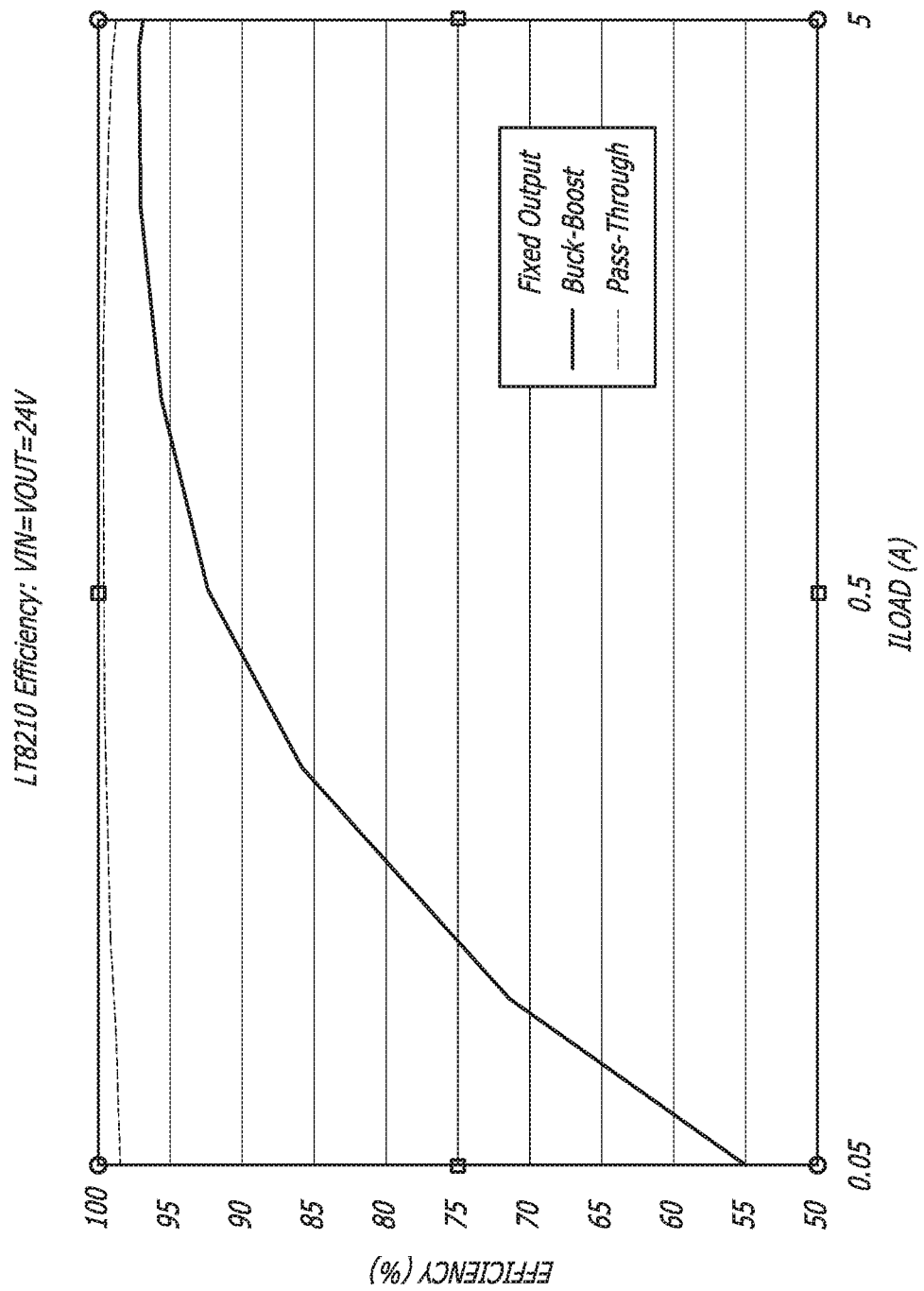
FIG. 5 illustrates an example of an efficiency comparison between pass-though and conventional buck-boost regulation.

FIG. 5 illustrates an example of an efficiency comparison between pass-though and conventional buck-boost regulation versus load current, ILOAD(A), on the output. Pass-through regulation is substantially more efficient across the entire range of output currents from very light load conditions at ILOAD=50 mA to maximum ILOAD=5A because there are no switching losses while in the non-switching state.

Figure 6:
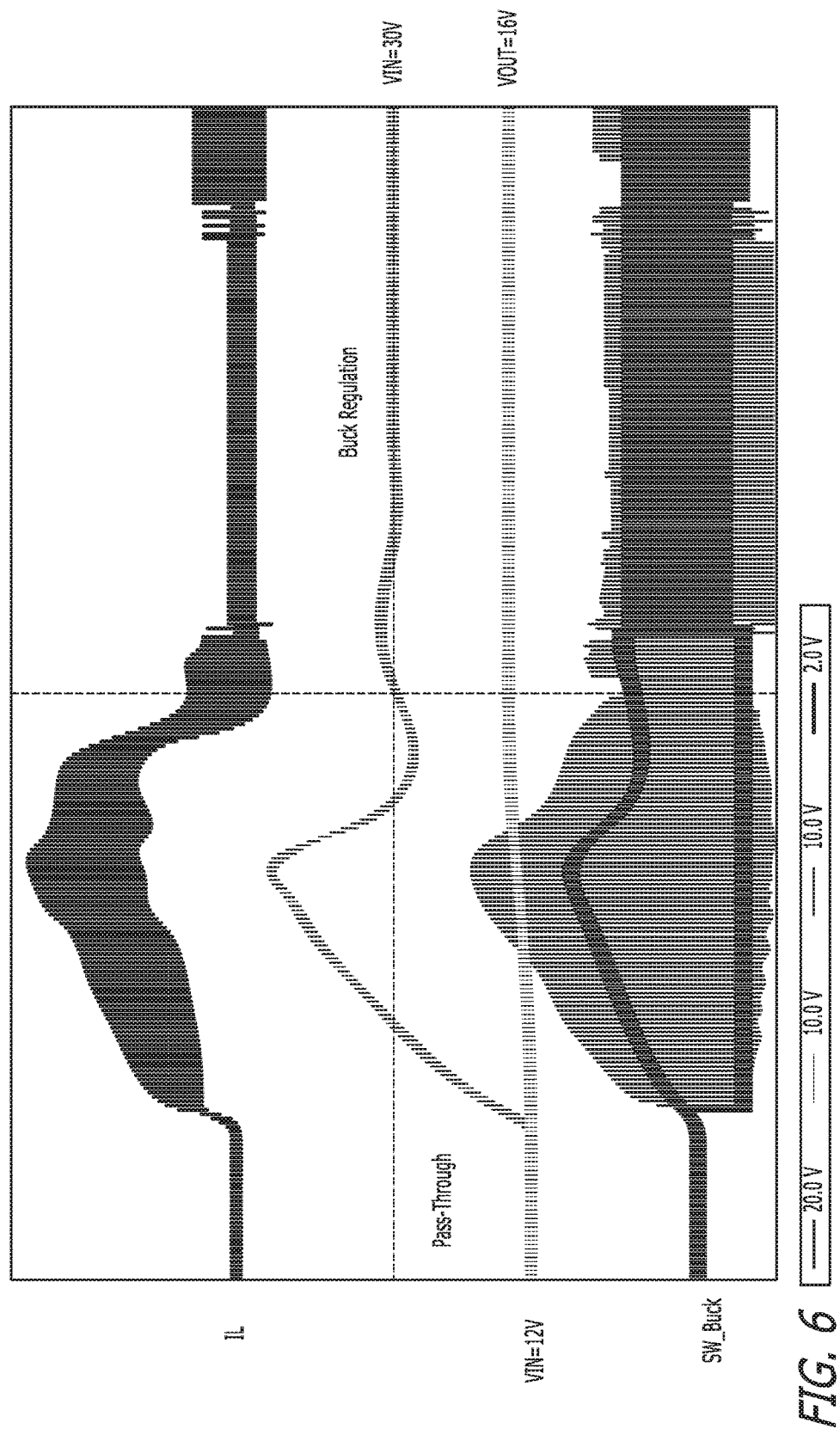
FIG. 6 illustrates an example of pass-through response to a large positive input transient.

FIG. 6 illustrates an example of pass-through response of the ADI LT8210 to a large positive input transient. The regulator initially resides in the pass-through non-switching state where the VIN and VOUT are substantially equal to 12V. A large positive transient raises the input voltage VIN from 12V to 45V over 200 us. Not long after the start of the transient VIN exceeds VOUT by 7%, causing switching to resume via a POS_TRAN pulse, the inductor current transitions smoothly from its non-switching DC value to its switching value and then ramps linearly with the soft-start capacitor voltage while VOUT is charged to the maximum value of the pass-through window 16V. The input voltage VIN settles at a final value of 30V causing the regulator to reside in the buck region and regulate VOUT to 16V.

Figure 7:
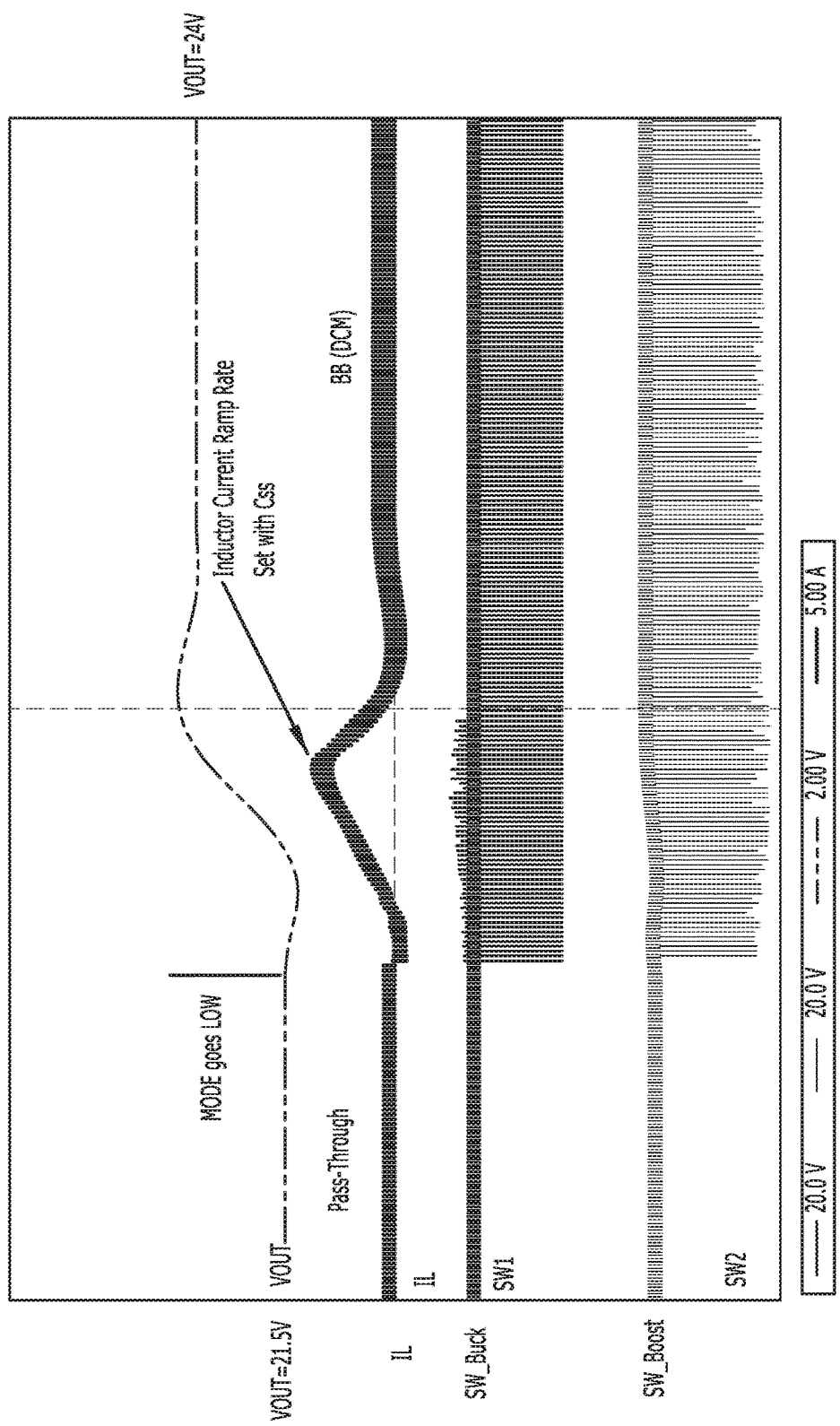
FIG. 7 illustrates an example of a transition from pass-through regulation to fixed output buck-boost regulation.

FIG. 7 illustrates an example of a transition of the ADI LT8210 from pass-through regulation to fixed output buck-boost regulation. The LT8210 initially resides in the pass-through non-switching state with VOUT sitting at 21.5V and the SW_BUCK and SW_BOOST nodes continually high. When the MODE signal transitions from high to low, pass-through operating mode is exited and switching resumes. The outputs of the buck and boost error amplifiers are buffered to a voltage which allows the inductor current to smoothly transition from its non-switching value to its switching value and the inductor current ramps linearly with the voltage on the soft-start capacitor. Once VOUT is charged to its fixed output target regulation voltage of 24V the inductor current IL returns to its nominal value and the regulator resides in the buck-boost region.

Figure 8:
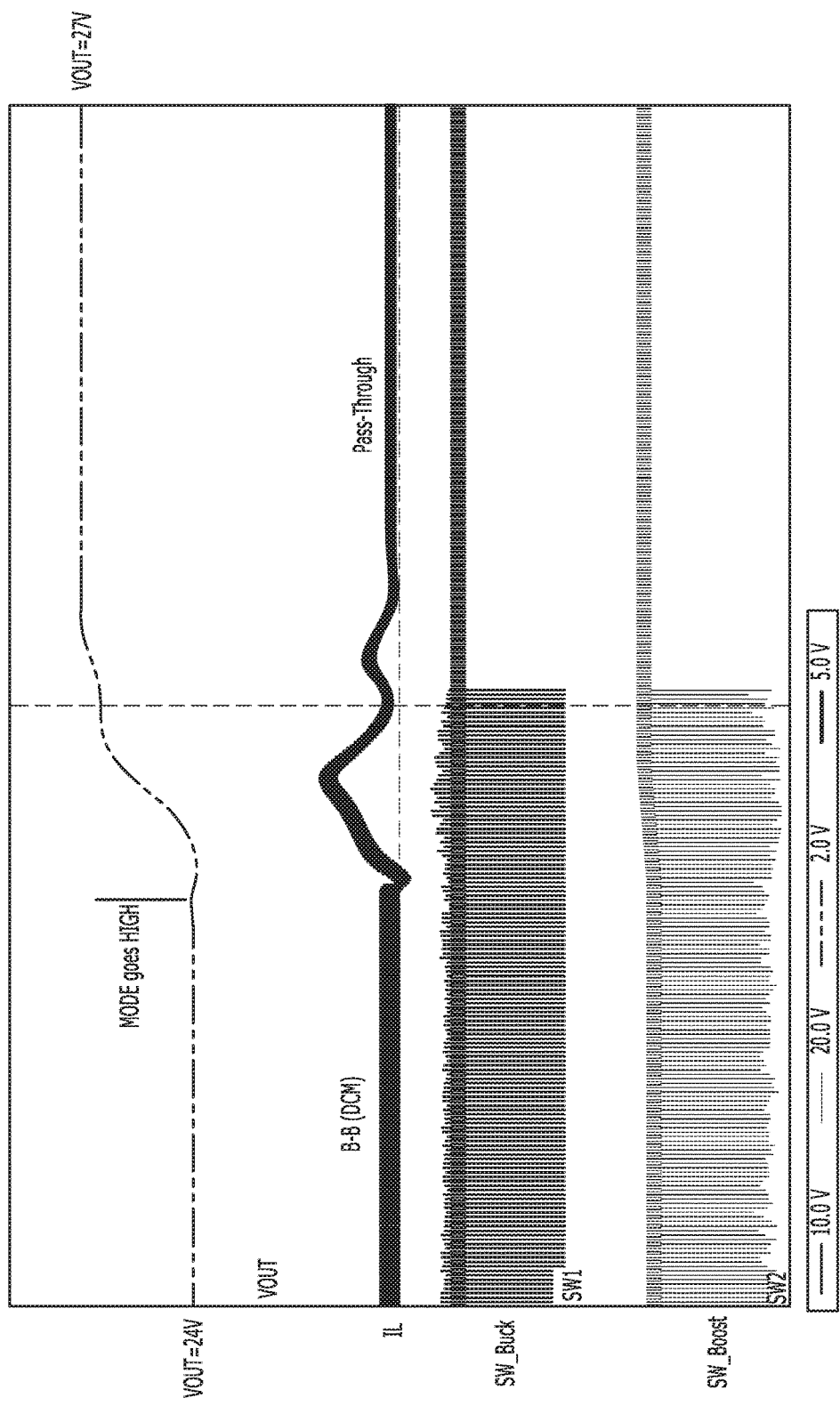
FIG. 8 illustrates an example of a transition from fixed output buck-boost regulation to pass-though regulation.

FIG. 8 illustrates an example of a transition of the ADI LT8210 from fixed output buck-boost regulation to the pass-through mode non-switching state. The LT8210 initially resides in the buck-boost region with VOUT regulated to 24V and the SW_BUCK and SW_BOOST nodes toggling at the switching clock frequency. When the MODE signal transitions from low to high, the fixed output voltage buck-boost mode is exited and the pass-through operating mode entered. The inductor current value ramps linearly with the soft-start capacitor voltage as the output voltage VOUT is charged. Once VOUT is within 3% of the input voltage VIN the LT8210 enters the non-switching state with the buck and boost top switches continually on and SW_BUCK and SW_BOOST and VOUT voltages substantially equal to the input voltage.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, the controller may monitor only the inductor current (not input and output voltages) in the pass through non-switching state and resume switching/disconnect the output when the measured current exceeds the positive/negative current limit, respectively. A disadvantage of monitoring only inductor current may be that it takes time (10's of microseconds) for large currents to develop across the inductor, whereas the direct comparison of the voltage across the inductor may only be limited by comparator propagation delay, making it much faster.

No form of regulation may be used to control the inductor voltage, other than the outer fault thresholds (output disconnect, POS_tran event to resume switching) and let RLC tank settle on its own. This may be a valid approach that may reduce the amount of switching that occurs depending on the noise on the input voltage. In general, pass-through regulation may trade off the amount of switching in the pass through window with how well the inductor current is controlled.

Pulse-skipping may be used, rather than interleaved buck-boost switching on the boundaries of the pass-through window to minimize the drop in efficiency.

If no reverse current can be tolerated, a zero-cross comparator can monitor the inductor current and disconnect the output when it its triggered. The trade-off may be increased switching in the pass-through region.

A regulator capable of regulating the output voltage to a window with a defined bottom, top, and pass-through region where the output may track the input voltage and a non-switching state may be entered can be accomplished with any regulator topology or cascade of regulator topologies capable of both stepping up and stepping down the input voltage to regulate the output voltage. A boost regulator followed by a buck regulator may be used for window regulation with the boost regulator maintaining the output voltage at the bottom of the window for input voltages equal to or below that value and the buck regulator maintaining the output voltage at the top of the window for input voltages equal to or above that value. Similarly, a cascade of a linear regulator capable of stepping down its output voltage from its input and a switching regulator capable of stepping up its output voltage from its input, such as a boost regulator, may be used in a similar fashion where the linear regulator maintains the output at the top of the window for input voltages equal to above that value and the boost regulator maintains the output voltage at the bottom of the window for input voltages equal to or below that value. A switching regulator capable of stepping up the output voltage from its input followed by a linear regulator capable of stepping down its output voltage from its input could be used in the same way.

Pass-through regulation may also be implemented with a switching regulator capable of only stepping down the output from the input voltage, such as a buck regulator. Such a regulator may regulate the output voltage at a predetermined maximum value for input voltages above that value and follow the input for voltages below that value. Within the pass-through region of the regulator switching may resume when the inductor voltage, or the difference between the input and output voltages, or inductor current, or input or output current, exceed predetermined levels and control the duty cycle of the power switches in such a way as to limit or minimize those quantities. Such a regulator may also pre-bias the duty cycle control circuitry so as to attempt to match the inductor current value at the transition between the non-switching and switching states. Once switching begins the inductor current, or input or output current, may ramp in a controlled fashion in response to a signal, such as the voltage across a soft-start capacitor or a tracking input.

The determination of switching region (boost, buck-boost, buck, pass-through), fault conditions, and mode transitions within the pass-through window may be accomplished by sensing the input voltage and output voltage directly, indirectly through a node voltage substantially equal to the input or output voltage, or through an external or internal resistive of capacitive divider circuit connected to the input or output or a node with voltage substantially similar to the voltage on the input and the output. In the pass-through non-switching state the input voltage and the voltage on the input terminal of the inductor will be substantially equal and the input or any node voltage between it and the inductor may be used in inferring the inductor voltage. In the non-switching pass-through state the output voltage and the voltage on the output terminal of the inductor will be substantially equal and the output or any node voltage between it and the inductor may be used in inferring the inductor voltage. When the buck and/or boost loop is switching a combination of the buck or boost top or bottom power switches on-times or duty cycles of may be used to for determining switching region, fault conditions, and mode transitions. The determination of fault conditions and mode transitions due to the measured current exceeding predetermined limits may be accomplished through measurement of the regulator input or output current, inductor current, or the current through power switches in the current path such as the buck and boost top switches while in the non-switching state. The switching regulator control scheme for pass-through regulation may be but is not limited to current mode control, voltage mode control, hysteretic control, or constant on-time control. The switches used for the switching regulator power stage may be implemented with field effect transistors, FETs, bipolar junction transistors, BJTs, IGBTs, or any device capable of modulating the conducting channel impedance in response to a controlling input signal, such as a gate voltage. The bottom switch of the buck regulator may be replaced with a diode for asynchronous buck regulation. The top switch of the boost regulator may be replaced with a diode for asynchronous boost regulation.

Within the pass-through region detection of reverse current flowing from the output back into the input may be accomplished through measurement of the input, output, inductor, buck top switch, or boost top switch current. Reverse current may also be determined by measuring the difference in voltage between any two or more nodes in the conducting path. The prevention of reverse current in the pass-through region may be accomplished by configuring power stage switches in a static state that disconnects the output and/or input of the regulator. An alternative approach is to cause switching to resume in discontinuous conduction mode once reverse current is detected.

The levels of the various thresholds and windows that have been discussed may also be different. The levels that have been set forth are only examples.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 201, 202, or 203 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A controller for controlling a buck-boost regulator having an input voltage and an output voltage, the controller comprising:
    circuitry that causes the output voltage of the buck-boost regulator to be at a bottom of a pre-determined voltage window when the input voltage goes below the bottom of the pre-determined voltage window;
    circuitry that causes the output voltage of the buck-boost regulator to be at a top of the pre-determined voltage window when the input voltage goes above the top of the pre-determined voltage window; and
    circuitry that causes the buck-boost regulator to pass the input voltage through the buck-boost regulator so as to cause the voltage output of the buck-boost regulator to be at the same level as the input voltage when the input voltage is within the pre-determined voltage window.

2. The controller of claim 1, wherein the buck-boost regulator includes an inductor with an input and an output, a top power switch that controllably connects the input of the inductor to the input voltage, a top power switch that controllably connects the output of the inductor to the output voltage, a bottom power switch that controllably connects the input to the inductor to ground, and a bottom power switch that controllably connects the output of the inductor to ground, the controller further comprising circuitry that causes the top power switches to be continually on and the bottom power switches to be continually off when the input voltage is within the pre-determined voltage window.

3. The controller of claim 1, wherein the pre-determined voltage window is a first voltage window, the controller further comprising:
   circuitry that causes the buck-boost regulator to operate in a buck mode when the input voltage is above a second voltage window that is just above or partially overlapping the top of the first voltage window;
   circuitry that causes the buck-boost regulator to operate in a buck-boost mode when the input voltage is within the second voltage window;
   circuitry that causes the buck-boost regulator to operate in a buck-boost mode when the input voltage is within a third voltage window that is just below or partially overlapping the bottom of the first voltage window; and
   circuitry that causes the buck-boost regulator to operate in a boost mode when the input voltage is below the third voltage window.

4. The controller of claim 1, wherein the buck-boost regulator includes an inductor with an input and an output, one or more top power switches that controllably connects the input of the inductor to the input voltage, and/or controllably connects the output of the inductor to the output voltage, and one or more bottom power switches, that controllably connects the input of the inductor to ground and/or controllably connects the output of the inductor to ground, the controller further comprising circuitry configured to, when the input voltage is within the pre-determined voltage window:
   cause the buck-boost regulator to operate with the top power switches continually on and the bottom power switches continually off when a magnitude of an inductor voltage representative of a voltage across the inductor does not exceed a pre-determined threshold; and
   cause the buck-boost regulator to operate with one or more of the top and bottom power switches actively switching to reduce the inductor voltage when the magnitude of the inductor voltage exceeds the pre-determined threshold.

5. The controller of claim 1, wherein the buck-boost regulator includes an inductor and has an input and an output, one or more top power switches that controllably connects the input of the inductor to the input voltage, and/or controllably connects the output of the inductor to the output voltage, and one or more bottom power switches that controllably connects the input of the inductor to ground and/or controllably connects the output of the inductor to ground, the controller further comprising circuitry configured to, when the input voltage is within the pre-determined voltage window:
   cause the buck-boost regulator to operate with the top power switches continually on and the bottom power switches continually off when a magnitude of a current representative of a current through the inductor does not exceed a pre-determined threshold; and
   cause the buck-boost regulator to operate with one or more of the top and bottom power switches actively switching to regulate or limit the current when the magnitude of the current exceeds the pre-determined threshold.

6. The controller of claim 1, wherein the buck-boost regulator includes an inductor that conducts current and has an input and an output, one or more top power switches that controllably connects the input of the inductor to the input voltage, and/or controllably connects the output of the inductor to the output voltage, and one or more bottom power switches that controllably connects the input of the inductor to ground and/or controllably connects the output of the inductor to ground, the controller further comprising:
   an error amplifier with an output that controls the current through the inductor;
   circuitry that causes the buck-boost regulator to operate with the top power switches continually on and the bottom power switches continually off during a non-switching mode;
   circuitry that causes the buck-boost regulator to operate with one or more of the top and bottom one or more of the top and bottom power switches actively switching to regulate the output voltage, inductor voltage, or inductor current during a switching mode; and
   circuitry that, when transitioning from the non-switching mode to the switching mode, adjusts the output of the error amplifier to a level that causes a value of the inductor current to immediately return to substantially an average value of the inductor current immediately before the transition.

7. The controller of claim 1, further comprising circuitry that allows the top and bottom of the pre-determined voltage window to be set to the same level.

8. A buck-boost regulator comprising controller circuitry for controlling the buck-boost regulator, the controller circuitry being configured to:
   maintain an output voltage of the buck-boost regulator at substantially a bottom of a pre-determined voltage window when an input voltage of the buck-boost regulator goes below the bottom of the pre-determined voltage window;
   maintain the output voltage of the buck-boost regulator at substantially a top of the pre-determined voltage window when the input voltage goes above the top of the pre-determined voltage window; and
   cause the buck-boost regulator to pass the input voltage through the buck-boost regulator so that the voltage output of the buck-boost regulator is at substantially the same level as the input voltage when the input voltage is within the pre-determined voltage window.

9. The buck-boost regulator of claim 8, wherein the buck-boost regulator includes an inductor with an input and an output, a top power switch that controllably connects the input of the inductor to the input voltage, a top power switch that controllably connects the output of the inductor to the output voltage, a bottom power switch that controllably connects the input to the inductor to ground, and a bottom power switch that controllably connects the output of the inductor to ground,
   wherein the controller circuitry is further configured to cause the top power switches to be continually on and the bottom power switches to be continually off when the input voltage is within the pre-determined voltage window.

10. The buck-boost regulator of claim 8, wherein the pre-determined voltage window is a first voltage window, the controller circuitry is further configured to:
   cause the buck-boost regulator to operate in a buck mode when the input voltage is above a second voltage window that is just above or partially overlapping the top of the first voltage window;
   cause the buck-boost regulator to operate in a buck-boost mode when the input voltage is within the second voltage window;

cause the buck-boost regulator to operate in a buck-boost mode when the input voltage is within a third voltage window that is just below or partially overlapping the bottom of the first voltage window; and cause the buck-boost regulator to operate in a boost mode when the input voltage is below the third voltage window.

11. The buck-boost regulator of claim 8, wherein the buck-boost regulator includes an inductor with an input and an output, one or more top power switches that controllably connects the input of the inductor to the input voltage, and/or controllably connects the output of the inductor to the output voltage, and one or more bottom power switches that controllably connects the input of the inductor to ground and/or controllably connects the output of the inductor to ground, wherein the controller circuitry is further configured to, when the input voltage is within the pre-determined voltage window:

cause the buck-boost regulator to operate with the top power switches continually on and the bottom power switches continually off when a magnitude of an inductor voltage representative of a voltage across the inductor does not exceed a pre-determined threshold; and cause the buck-boost regulator to operate with one or more of the top and bottom power switches actively switching to reduce the inductor voltage when the magnitude of the inductor voltage exceeds the pre-determined threshold.

12. The buck-boost regulator of claim 8, wherein the buck-boost regulator includes an inductor that conducts current and has an input and an output, one or more top power switches that controllably connects the input of the inductor to the input voltage, and/or controllably connects the output of the inductor to the output voltage, and one or more bottom power switches that controllably connects the input of the inductor to ground and/or controllably connects the output of the inductor to ground, wherein the controller circuitry is further configured to, when the input voltage is within the pre-determined voltage window:

cause the buck-boost regulator to operate with the top power switches continually on and the bottom power switches continually off when a magnitude of a current representative of a current through the inductor does not exceed a pre-determined threshold; and cause the buck-boost regulator to operate with one or more of the top and bottom power switches actively switching to regulate or limit the inductor current when the magnitude of the current in the inductor exceeds the pre-determined threshold.

13. The buck-boost regulator of claim 8, wherein the buck-boost regulator includes an inductor that conducts current and has an input and an output, one or more top power switches that controllably connects the input of the inductor to the input voltage, and/or controllably connects the output of the inductor to the output voltage, and one or more bottom power switches that controllably connects the input of the inductor to ground and/or controllably connects the output of the inductor to ground, and a bottom power switch that controllably connects the output of the inductor to ground, wherein the controller circuitry comprises an error amplifier with an output that controls the current through the inductor, the controller circuitry further configured to:

cause the buck-boost regulator to operate with the top power switches continually on and the bottom power switches continually off during a non-switching mode;

cause the buck-boost regulator to operate with one or more of the top and bottom power switches actively switching to regulate the output voltage, inductor voltage, or inductor current during a switching mode; and adjust, when transitioning from the non-switching mode to the switching mode, the output of the error amplifier to a level that causes a value of the inductor current to immediately return to substantially the average value of the inductor current immediately before the transition.

14. The buck-boost regulator of claim 8, further comprising circuitry that allows the top and bottom of the pre-determined voltage window to be set to the same level.

15. A controller for controlling a buck-boost regulator having an input voltage and an output voltage, the controller comprising:

means for causing the output voltage of the buck-boost regulator to be at a bottom of a pre-determined voltage window when the input voltage goes below the bottom of the pre-determined voltage window;

means for causing the output voltage of the buck-boost regulator to be at a top of the pre-determined voltage window when the input voltage goes above the top of the pre-determined voltage window; and means for causing the buck-boost regulator to pass the input voltage through the buck-boost regulator so as to cause the voltage output of the buck-boost regulator to be at the same level as the input voltage when the input voltage is within the pre-determined voltage window.

16. The controller of claim 15, wherein the buck-boost regulator includes an inductor with an input and an output, a top power switch that controllably connects the input of the inductor to the input voltage, a top power switch that controllably connects the output of the inductor to the output voltage, a bottom power switch that controllably connects the input to the inductor to ground, and a bottom power switch that controllably connects the output of the inductor to ground, the controller further comprising means that causes the top power switches to be continually on and the bottom power switches to be continually off when the input voltage is within the pre-determined voltage window.

17. The controller of claim 15, wherein the pre-determined voltage window is a first voltage window, the controller further comprising:

means for causing the buck-boost regulator to operate in a buck mode when the input voltage is above a second voltage window that is just above or partially overlapping the top of the first voltage window;

means for causing the buck-boost regulator to operate in a buck-boost mode when the input voltage is within the second voltage window;

means for causing the buck-boost regulator to operate in a buck-boost mode when the input voltage is within a third voltage window that is just below or partially overlapping the bottom of the first voltage window; and means for causing the buck-boost regulator to operate in a boost mode when the input voltage is below the third voltage window.

18. The controller of claim 15, wherein the buck-boost regulator includes an inductor with an input and an output, one or more top power switches that controllably connects the input of the inductor to the input voltage, and/or controllably connects the output of the inductor to the output voltage, and one or more bottom power switches that controllably connects the input of the inductor to ground and/or controllably connects the output of the inductor to ground, the controller further comprising, when the input voltage is within the pre-determined voltage window:

means for causing the buck-boost regulator to operate with the top power switches continually on and the bottom power switches continually off when a magnitude of an-inductor voltage representative of a voltage across the inductor does not exceed a pre-determined threshold; and means for causing the buck-boost regulator to operate with one or more of the top and bottom power switches actively switching to reduce the inductor voltage when the magnitude of the inductor voltage exceeds the pre-determined threshold.

19. The controller of claim 15, wherein the buck-boost regulator includes an inductor that conducts current and has an input and an output, one or more top power switches that controllably connects the input of the inductor to the input voltage, and/or controllably connects the output of the inductor to the output voltage, and one or more bottom power switches that controllably connects the input of the inductor to ground and/or controllably connects the output of the inductor to ground, the controller further comprising, when the input voltage is within the pre-determined voltage window:

means for causing the buck-boost regulator to operate with the top power switches continually on and the bottom power switches continually off when a magnitude of a current representative of a current through the inductor does not exceed a pre-determined threshold; and means for causing the buck-boost regulator to operate with one or more of the top and bottom power switches actively switching to regulate or limit the inductor current when the magnitude of the current in the inductor exceeds the pre-determined threshold.

20. The controller of claim 15, wherein the buck-boost regulator includes an inductor that conducts current and has an input and an output, one or more top power switches that controllably connects the input of the inductor to the input voltage, and/or controllably connects the output of the inductor to the output voltage, and one or more bottom power switches that controllably connects the input of the inductor to ground and/or controllably connects the output of the inductor to ground, the controller further comprising:

an error amplifier with an output that controls the current through the inductor;

means for causing the buck-boost regulator to operate with the top power switches continually on and the bottom power switches continually off during a non-switching mode;

means for causing the buck-boost regulator to operate with one or more of the top and bottom power switches actively switching to regulate the output voltage, inductor voltage, or inductor current during a switching mode; and means for adjusting, when transitioning from the non-switching mode to the switching mode, a value of the inductor current to substantially an average value of the inductor current immediately before the transition.

21. The controller of claim 15, further comprising means that allows the top and bottom of the pre-determined voltage window to he set to the same level.

22. The controller of claim 1, wherein the buck-boost regulator includes an inductor, a first top power switch that controllably connects a first side of the inductor to the input voltage, a second top power switch that controllably connects a second side of the inductor to the output voltage, and a diode connected between the first side of the inductor and ground and/or a diode connected between the second side of the inductor and ground.

23. A method for controlling a buck-boost regulator, comprising:

maintaining an output voltage of the buck-boost regulator at substantially a bottom of a pre-determined voltage window when an input voltage of the buck-boost regulator goes below the bottom of the pre-determined voltage window;

maintaining the output voltage of the buck-boost regulator at substantially a top of the pre-determined voltage window when the input voltage goes above the top of the pre-determined voltage window; and causing the buck-boost regulator to pass the input voltage through the buck-boost regulator so that the voltage output of the buck-boost regulator is at substantially the same level as the input voltage when the input voltage is within the pre-determined voltage window.

24. The method of claim 23, wherein the pre-determined voltage window is a first voltage window, the method further comprising:

operating the buck-boost regulator in a buck mode when the input voltage is above a second voltage window that is just above or partially overlapping the top of the first voltage window;

operating the buck-boost regulator in a buck-boost mode when the input voltage is within the second voltage window;

operating the buck-boost regulator in a buck-boost mode when the input voltage is within a third voltage window that is just below or partially overlapping the bottom of the first voltage window; and operating the buck-boost regulator in a boost mode when the input voltage is below the third voltage window.

25. The method of claim 23, wherein the buck-boost regulator includes an inductor with an input and an output, one or more top power switches that controllably connects the input of the inductor to the input voltage, and/or controllably connects the output of the inductor to the output voltage, and one or more bottom power switches that controllably connects the input of the inductor to ground and/or controllably connects the output of the inductor to ground, wherein the method further comprises, when the input voltage is within the pre-determined voltage window:

operating the buck-boost regulator with the top power switches continually on and the bottom power switches continually off when a magnitude of an inductor voltage representative of a voltage across the inductor does not exceed a pre-determined threshold; and operating the buck-boost regulator with one or more of the top and bottom power switches actively switching to reduce the inductor voltage when the magnitude of the inductor voltage exceeds the pre-determined threshold.

26. The method of claim 23, wherein the buck-boost regulator includes an inductor that conducts current and has an input and an output, one or more top power switches that controllably connects the input of the inductor to the input voltage, and/or controllably connects the output of the inductor to the output voltage, and one or more bottom power switches that controllably connects the input of the inductor to ground and/or controllably connects the output of the inductor to ground, wherein the method further comprises, when the input voltage is within the pre-determined voltage window:

operating the buck-boost regulator with the top power switches continually on and the bottom power switches continually off when a magnitude of a current representative of a current through the inductor does not exceed a pre-determined threshold; and operating the buck-boost regulator with one or more of the top and bottom power switches actively switching to regulate or limit the inductor current when the magnitude of the current in the inductor exceeds the pre-determined threshold.

27. The method of claim 23, wherein the buck-boost regulator includes an inductor that conducts current and has an input and an output, one or more top power switches that controllably connects the input of the inductor to the input voltage, and/or controllably connects the output of the inductor to the output voltage, and one or more bottom power switches that controllably connects the input of the inductor to ground, and/or controllably connects the output of the inductor to ground, and a bottom power switch that controllably connects the output of the inductor to ground, wherein the method further comprises:

operating the buck-boost regulator with the top power switches continually on and the bottom power switches continually off during a non-switching mode;

operating the buck-boost regulator with one or more of the top and bottom power switches actively switching to regulate the output voltage, inductor voltage, or inductor current during a switching mode; and adjust, when transitioning from the non-switching mode to the switching mode, a value of the inductor current to immediately return to substantially an average value of the inductor current immediately before the transition.

* * * * *